(12) United States Patent
Boyd et al.

(10) Patent No.: US 8,099,387 B2
(45) Date of Patent: Jan. 17, 2012

(54) MANAGING CONSISTENCY GROUPS USING HETEROGENEOUS REPLICATION ENGINES

(75) Inventors: Kenneth Wayne Boyd, Tucson, AZ (US); Kenneth Fairclough Day, III, Tucson, AZ (US); Gerardo De Jesus Frias Garcia, Morgan Hill, CA (US); John Earle Lindley, San Jose, CA (US); Gregory Edward McBride, Vail, AZ (US); Ryusuke Ito, Kanagawa-ken (JP); Yasumitsu Mizoguchi, Kanagawa-ken (JP); Kenta Ninose, Kanagawa-ken (JP); Akinobu Shimada, Kanagawa-ken (JP); Tsutomu Sukigara, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 12/131,877

(22) Filed: Jun. 2, 2008

(65) Prior Publication Data
US 2009/0300078 A1      Dec. 3, 2009

(51) Int. Cl.
*G06F 17/30* (2006.01)
(52) U.S. Cl. .. 707/610; 707/640; 707/661; 707/E17.001
(58) Field of Classification Search ........... 707/999.204, 707/E17.001, 640, 661, 610
See application file for complete search history.

(56) References Cited

U.S. PATENT DOCUMENTS

2004/0059870 A1* 3/2004 Ash et al. ............... 711/119
2004/0139367 A1* 7/2004 Boyd et al. ............. 714/7
2006/0136685 A1 6/2006 Griv et al.
2007/0083569 A1 4/2007 Wong et al.

(Continued)

FOREIGN PATENT DOCUMENTS

EP        0 602 822 B1    9/2000

OTHER PUBLICATIONS

"DFSMS Advanced Copy Services", IBM Corp., IBM Document No. SC35-0428-11, Sep. 7, pp. 1-771.

(Continued)

*Primary Examiner* — Tim T Vo
*Assistant Examiner* — Shiow-Jy Fan
(74) *Attorney, Agent, or Firm* — David W. Victor; Konrad Raynes & Victor LLP

(57) ABSTRACT

Provided are a method, system, and article of manufacture for managing consistency groups using heterogeneous replication engines replicating data. A common linkage manager issues a prepare to create consistency group command to a first replication manager and a second replication manager, wherein the first and second replication managers issue create consistency group commands to first and second replication engines, respectively, to form a consistency group of data at a first source storage and a second source storage to copy to a first target storage and second target storage, respectively. The first and second replication managers form a first consistency group and a second consistency group of data from the first and second source storages, respectively, that are consistent as of a point-in-time in response to the create consistency group command; transmitting, by the first and second replication managers, the data in the formed first and second consistency groups to a first journal and second journal, respectively. The first and second replication managers commit the data in the first and second consistency groups in the first and second journals to the first and second target storages, respectively, in response to the first and second replication managers receiving a commit command.

24 Claims, 21 Drawing Sheets

U.S. PATENT DOCUMENTS

| | | | |
|---|---|---|---|
| 2007/0185939 A1* | 8/2007 | Prahland et al. | 707/204 |
| 2007/0294314 A1* | 12/2007 | Padovano et al. | 707/201 |
| 2008/0168218 A1 | 7/2008 | Arakawa et al. | |
| 2008/0177964 A1 | 7/2008 | Takahashi et al. | |
| 2008/0243952 A1* | 10/2008 | Webman et al. | 707/204 |
| 2009/0198949 A1 | 8/2009 | Kuligowski et al. | |
| 2009/0300304 A1 | 12/2009 | Boyd et al. | |

OTHER PUBLICATIONS

"IBM System z9 Business Resiliency and Security Frequently Asked Questions", IBM Corp., Sep. 5, pp. 1-31.

"IBM System z9 109", IBM Corp., Hardware Announcement, Jul. 27, 2005, pp. 1-13.

First Office Action dated May 2, 2011, pp. 1-35, for U.S. Appl. No. 12/187,298, by inventors Boyd, et al.

Response dated Aug. 2, 2011, pp. 1-30, to First Office Action dated May 2, 2011, pp. 1-35,for U.S. Appl. No. 12/187,298, by inventors Boyd, et al. (18.270).

* cited by examiner

MANAGING CONSISTENCY GROUPS USING HETEROGENEOUS REPLICATION ENGINES

BACKGROUND OF THE INVENTION

1. Field of the Invention

The present invention relates to a method, system, and article of manufacture for managing consistency groups using heterogeneous replication engines.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. In certain data mirroring systems, a timer is used to provide a uniform time across systems so that updates written by different applications to different primary storage devices use consistent time-of-day (TOD) value as a time stamp. The host operating system or the application may time stamp updates to a data set or set of data sets when writing such data sets to volumes in the primary storage. The integrity of data updates is related to insuring that updates are done at the secondary volumes in the volume pair in the same order as they were done on the primary volume. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of a previous data write is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

Other data mirroring systems use different replication technologies to provide copies of the primary volume. Different copy technologies may form consistency groups using different methodologies and algorithms. If an application has data stored in two data mirroring systems, the dependency of writes in one system on writes in the other system may not be detected given both systems are acting independently within their different and possibly incompatible technologies. Consistency therefore would not be maintained across the consistency groups formed using different technologies.

For this reason, there is a need in the art for improved techniques for managing consistency groups across different replication technologies.

SUMMARY

Provided are a method, system, and article of manufacture for managing consistency groups using heterogeneous replication engines replicating data. A common linkage manager issues a prepare to create consistency group command to a first replication manager and a second replication manager, wherein the first and second replication managers issue create consistency group commands to first and second replication engines, respectively, to form a consistency group of data at a first source storage and a second source storage to copy to a first target storage and second target storage, respectively. The first and second replication managers form a first consistency group and a second consistency group of data from the first and second source storages, respectively, that are consistent as of a point-in-time in response to the create consistency group command; transmitting, by the first and second replication managers, the data in the formed first and second consistency groups to a first journal and second journal, respectively. The first and second replication managers commit the data in the first and second consistency groups in the first and second journals to the first and second target storages, respectively, in response to the first and second replication managers receiving a commit command.

In a further embodiment, the common linkage manager issues a subsequent instance of the create consistency group command to the first and second replication managers to form additional first and second consistency groups at a subsequent point-in-time in response to the first and second replication managers committing the first and second consistency groups in the first and second journals to first and second target storages, respectively.

In a further embodiment, the common linkage manager issues a commit command to the first and second replication managers for the consistency group, wherein the first and second replication managers commit the data in the first and second consistency groups, respectively, in response to receiving the commit command, and wherein the first and second replication managers use different first and second commit technologies to commit data in the first and second journals to the first and second target storages, respectively.

In a further embodiment, the first and second replication managers use different copy technologies to commit data from the first and second journals to the first and second target storages, respectively.

In a further embodiment, the common linkage manager issues a query command to the first and second replication managers. The first and second replication managers determine whether the data in the first and second consistency groups are in the first and second journals, respectively, in response to the query command. The first and second replication managers issue journal complete messages in response to determining that the data in the first and second consistency groups are in the first and second journals, respectively. The common linkage manager communicates a commit command to the first and second replication managers to commit the data in the first and second journals in response to receiving the first and second journal complete message.

In a further embodiment, the create consistency group command comprises a freeze command and run command. The first replication manager uses a first replication technology, in response to the freeze command, to quiesce writes to the first source storage and create replication information indicating modified data in the first source storage consistent as of the point-in-time to copy to the first journal. The first replication manager uses the first replication technology, in response to the run command, to allow writes to continue to the first source storage and to copy data in the first source storage indicated in the replicate information to the first source storage to the first journal. The second replication manager uses a second replication technology to copy updates to the second source storage to the second journal, including updates having timestamps before and after the point-in-time of the consistency groups.

In a further embodiment, the first replication manager uses the first commit technology, in response to the commit command, to create a virtual copy of the data in the first journal at the first target storage indicating data in the first consistency group, wherein data indicated in the virtual copy is copied to the first target storage in response to an update to the data in the first consistency group being applied to the first journal. The second replication manager uses the second commit technology, in response to the commit command, to copy data in the second journal having timestamps not greater than the point-in-time.

In a further embodiment, the common linkage manager issues a query command to the first and second replication managers. The first replication manager using the first replication technology to determine whether the data indicated in the replication information was copied to the first journal. The second replication manager uses the second replication technology to determine whether the second journal includes data having a timestamp greater than the point-in-time. The commit operations are performed by the first and second replication managers in response to determining that the data indicated in the replication information was copied to the first journal and in response to determining that the second journal includes data having a timestamp greater than the point-in-time.

In a further embodiment, the first and second replication managers comprise replication managers from different replication manager vendors.

In a further embodiment, the first and second replication managers are located at a primary system. The common linkage manager sends a restore command to a first and second replication managers at a secondary system. The first and second replication managers at the secondary system copy data from the first and second consistency groups in the first and second target storages to the first and second journals, respectively, in response to the restore command. The first and second replication managers at the secondary system copy data from the first and second consistency groups in the first and second journals to the first and second source storages, respectively, to make the data at the first and second source storages consistent as of the point-in-time of the first and second consistency groups.

In a further embodiment, the restore command is sent in response to a failure at the primary site. The common linkage manager performs a failover from the primary site to the secondary site, wherein applicants submit Input/Output (I/O) requests to the first and second target storages in response to the failover.

In a further embodiment, the first and second replication managers communicate first and second replication engine specific commands to a first and second replication engines, respectively, to cause the first and second replication engines to perform operations to form the first and second consistency groups, respectively, transmit the data in the first and second consistency groups to the first and second journals, respectively, and to commit the data in the first and second journals to the first and second target storages, respectively.

DETAILED DESCRIPTION

Figure 1:
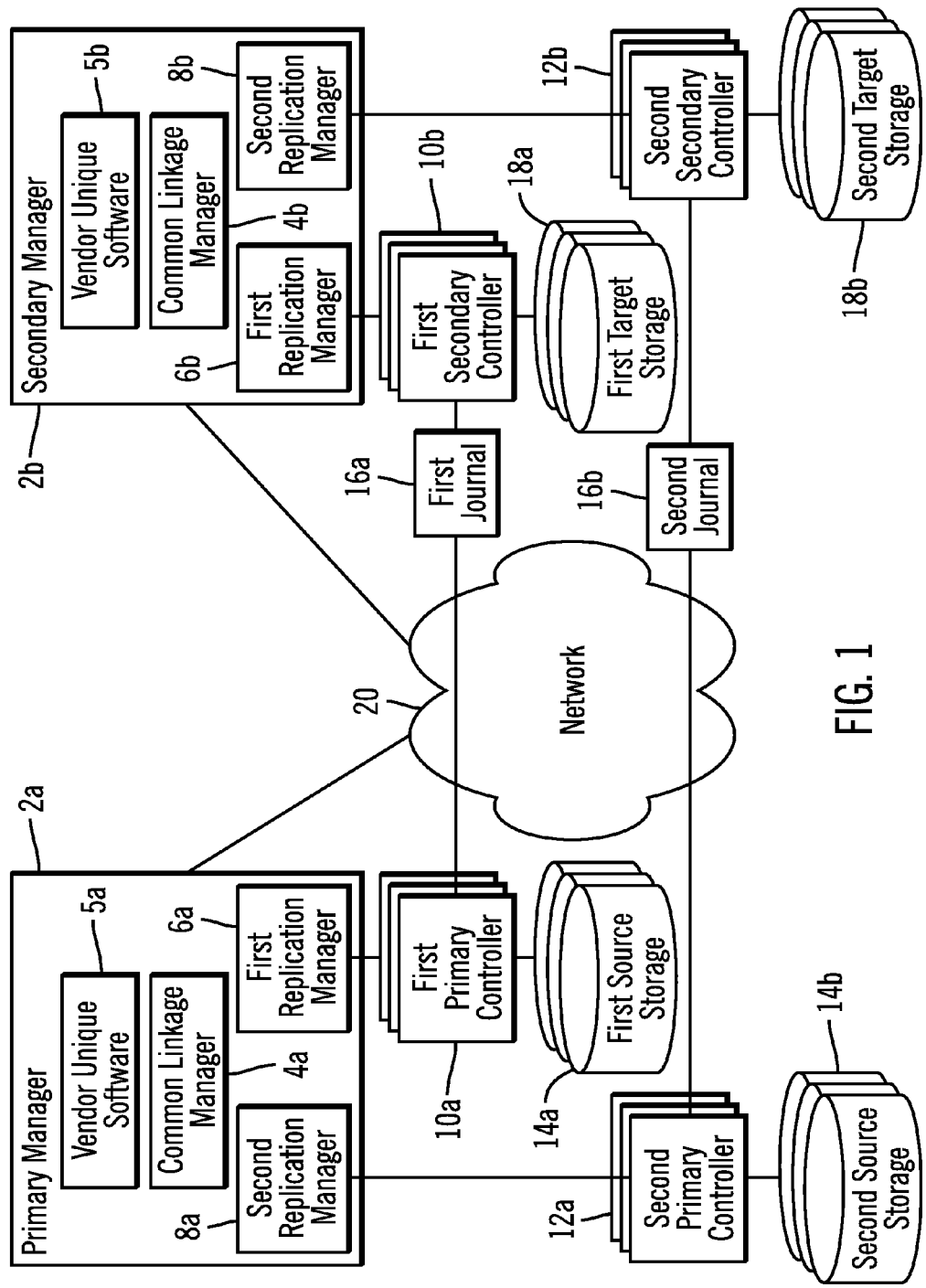
FIG. 1 illustrates an embodiment of a computing environment.

FIG. 1 illustrates an embodiment of a computing environment in which a primary manager 2a and secondary manager 2b each include a common linkage manager 4a, 4b and first replication manager 6a, 6b and second replication manager 8a, 8b. Each of the first 6a, 6b and second 8a, 8b replication managers translate generic replication commands from the common linkage manager 4a, 4b into specific replication engine commands for first 50 and second 52 (FIGS. 2 and 3) replication engines, respectively. The first 50 and second 52 replication engines comprise replication engines implementing different replication technologies from different vendors or a same vendor. Alternatively, the different replication engines 50 and 52 may provide different implementations of a same replication method. The managers 2a and 2b may further include vendor unique software 5a and 5b, respectively, a layer on top of common linkage manager 4a, 4b that is a remote management program that invokes the common linkage manager 4a, 4b and manages replication. In this way, different vendor unique software 5a and 5b may invoke and communicate with the common linkage manager 4a, 4b to perform replication operations.

The first replication manager 6a, 6b can control replication operations for a replication engine 50 on the first primary 10a and first secondary 10b controllers and the second replication manager 8a, 8b can control replication operations for a replication engine 52 on the second primary 12a and second secondary 12b controllers. The replication engine 50 on the first primary controller 10a copies changed data for a first source storage 14a to a first journal 16a and then commits the data in the first journal 16a to a first target storage 18a managed by the first secondary controller 12a. The replication engine 52 on the second primary controller 10b copies changed data for a second source storage 14b to a second journal 16b and then commits the data in the second journal 16b to a second target storage 18b.

There may be one or more instances of the components shown in FIG. 1.

Different replication engine technologies may use different techniques to buffer changed data that is yet to be committed. For instance, some replication technologies use a journal to buffer updates, whereas other use other technologies to maintain updates before the data is committed, such as making a "flash copy" of updated data that has not yet been committed to storage.

A network 20 enables communication among the managers 2a, 2b, primary controllers 10a, 10b, secondary controllers 12a, 12b, and journals 16a, 16b. The network 20 may comprise a Storage Area Network (SAN), Local Area Network (LAN), Intranet, the Internet, Wide Area Network (WAN), peer-to-peer network, wireless network, arbitrated loop network, etc. Further, there may be different networks between the managers 2a and 2b and the controllers 10a, 10b, 12a, 12b.

The managers 2a, 2b and controllers 10a, 10b, 12a, 12b may comprise a suitable computational device known in the art, such as a server, enterprise storage server, etc. The storages 14a, 14b, 18a, 18b may be implemented in a storage system known in the art, such as a storage system including a plurality of storage devices, e.g., interconnected hard disk drives (a Redundant Array of Independent Disks (RAID)), Just a Bunch of Disks (JBOD), Direct Access Storage Device (DASD), disks connected in a loop configuration (serial loop, Fibre Channel Arbitrated Loop), a single storage device, a tape library, an optical library, a network attached storage (NAS), etc.

The journals 16a, 16b may be implemented in a separate, intermediary computer system or alternatively implemented in the first secondary 10b and second secondary 12b controllers, respectively.

Although only two replication managers are shown, there may be more than two replication managers in the manager 2a, 2b systems. Further, there may be multiple primary and secondary controllers that work together to form common consistency groups as of a common point-in-time.

Figure 2:
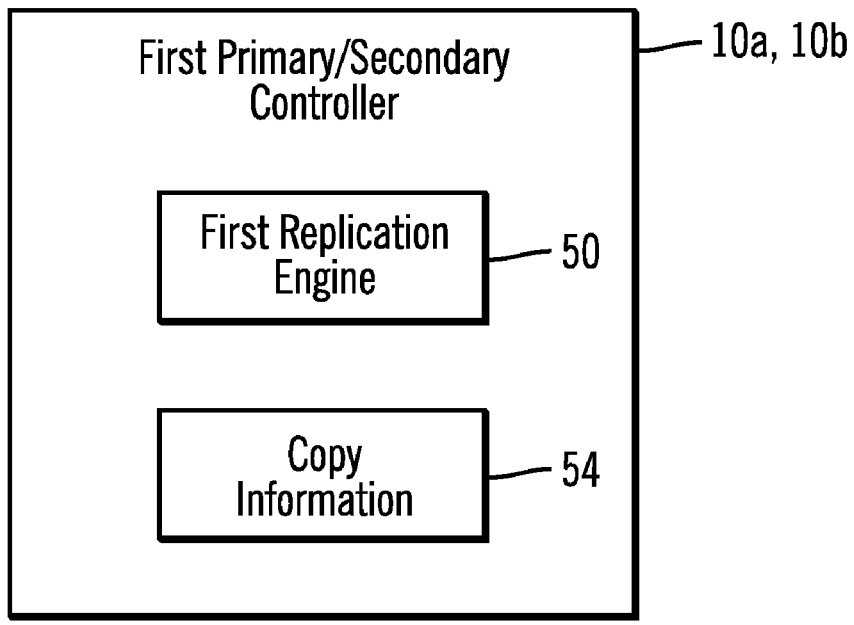
FIGS. 2 and 3 illustrate an embodiment of components in primary and secondary controllers.

FIG. 2 illustrates an embodiment of components on the first primary 10a and first secondary 10b controllers, including a first replication engine 50 and copy information 54, such as an out-of-synch bitmap, that indicates updates to the first source storage 14a volumes in one consistency group that need to be copied over to the first journal 16 per a consistency interval replication method.

Figure 3:
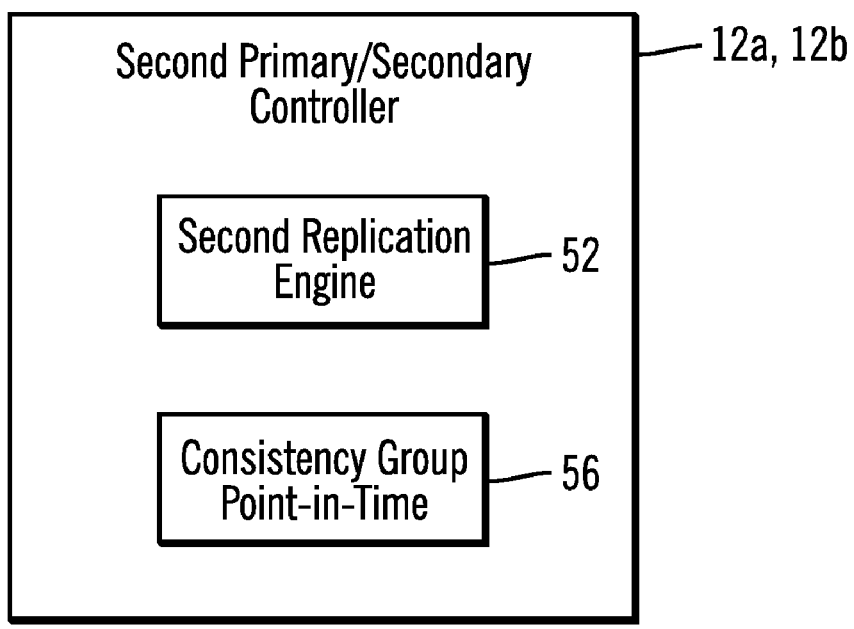

FIG. 3 illustrates an embodiment of components on the second primary 12a and second secondary 12b controllers, including a second replication engine 52 and a consistency group point-in-time 56 indicating a point-in-time of a consistency group to form. The second replication engine 52 may implement a timestamp replication method that continually sends updates to the second journal 16b, but only updates in the second journal 16b consistent as of the point in time 56 are committed to the second target storage 18b.

Figure 4:
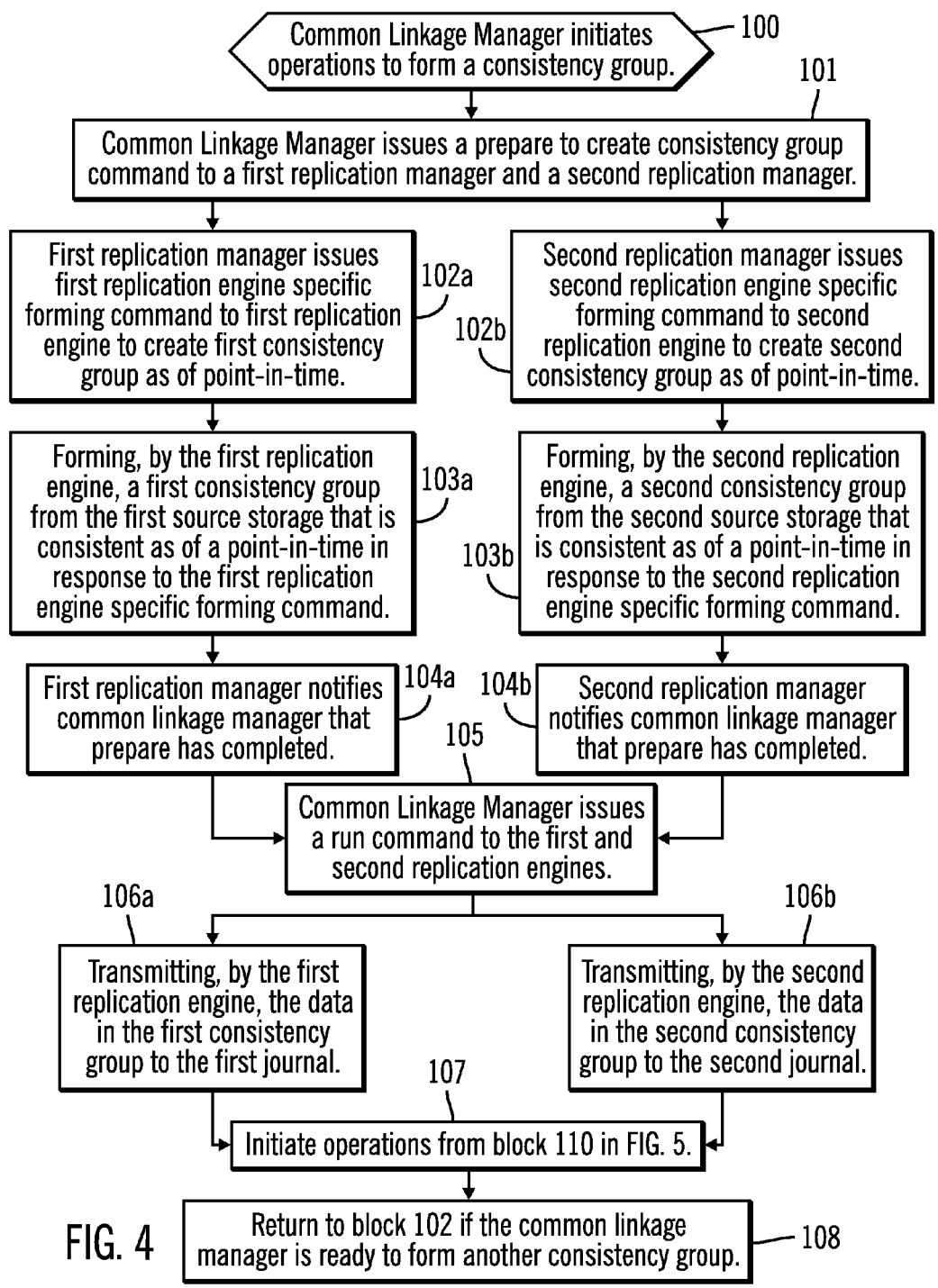
FIGS. 4 and 5 illustrate an embodiment of operations to form a consistency group.

FIG. 4 illustrates an embodiment of operations performed by the common linkage manager 4a, first replication 6a and second replication 8a managers, and first 50 and second 52 replication engines to form a consistency group. The common linkage manager 2a initiates (at block 100) operations to form a consistency group and issues (at block 101) a prepare command to the first replication manager 6a and the second replication manager 8a to prepare for the consistency group. In response to receiving the generic prepare commands, the first 50 and second 52 replication engines issue (at blocks 102a and 102b) first and second replication engine specific commands to the first 50 and second 52 replication engines, respectively, to create first and second consistency groups as of a point-in-time. The first 50 and second 52 replication engines may form consistency groups using different replication methods and use different vendor specific programming interfaces. Certain replication engines may perform no action in response to a specific generic replication request from the common linkage managers 2a, 2b.

In response to the first and second replication engine specific consistency group forming commands, the first 50 and second 52 replication engines form (at blocks 103a and 103b) a first and second consistency groups of updates to the first 14a and second 14b source storages, respectively, that are consistent as of a determined consistency group point-in-time. The replication engines 50 and 52 may form consistency groups using very different vendor specific techniques.

The replication engines 50 and 52 then notify (at block 104a and 104b) the common linkage manager 4a that the preparations for the consistency group has completed. In response, to receiving the notifications from both replication engines 50 and 52, the common linkage manager 4a issues (at block 105) a generic run command to the first 50 and second 52 replication engines. Upon receiving the run command from the common linkage manager 4a, the replication engines 50 and 52 may transmit (at block 106a and 106b) the data in the first and second consistency groups to the first 16a and second 16b journals, respectively. The common linkage manager 4a initiates (at block 107) the operation at block 110 in FIG. 5 to perform a ready to commit and commit operation. Independently of committing, the common linkage manager 4 returns (at block 108) to block 100 to form a next consistency group when ready to form another consistency group.

Figure 5:
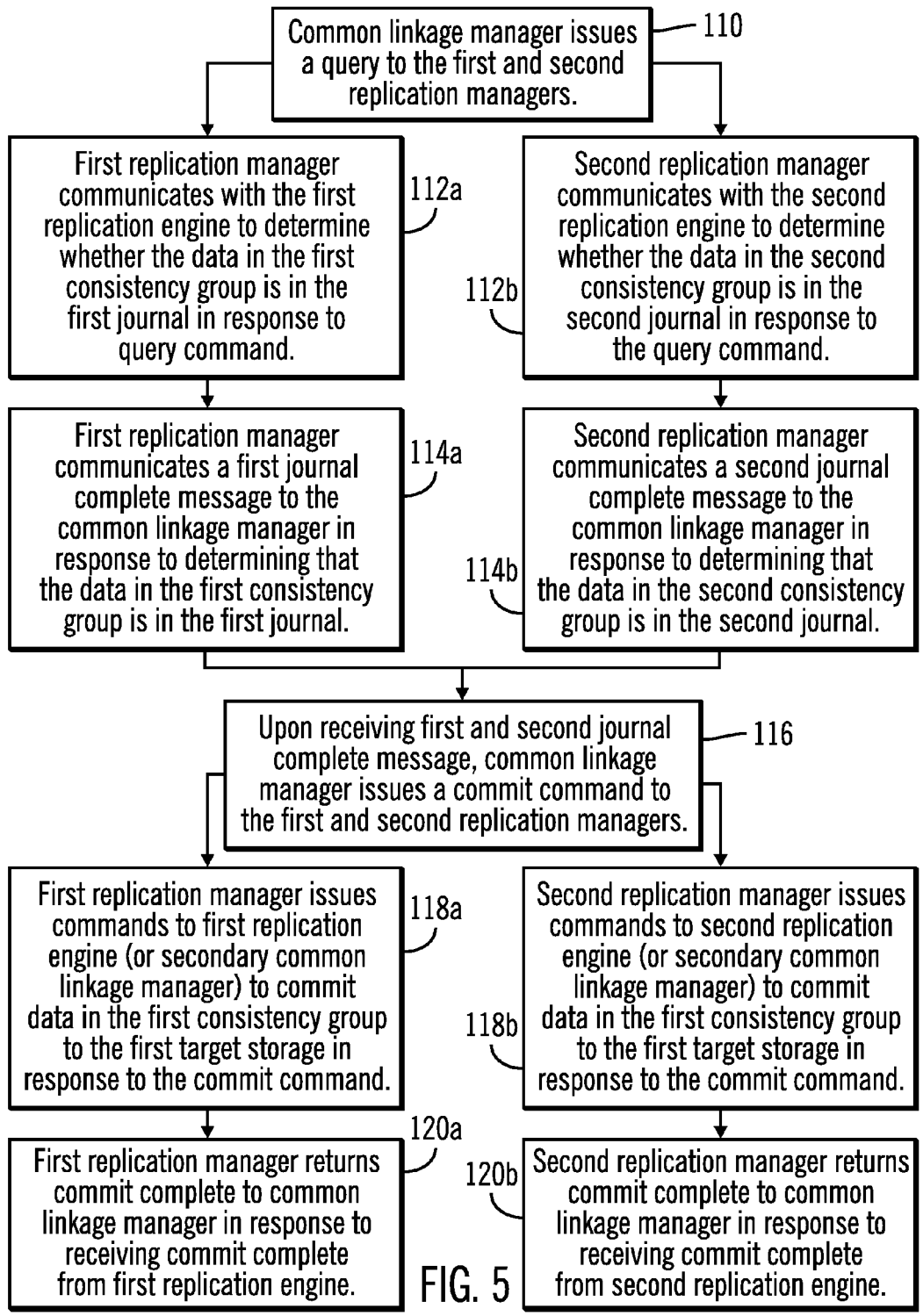

With respect to FIG. 5, the common linkage manager 4a may issue (at block 110) a generic query to the first 6a and second 8a replication managers to determine whether all the data in the first and second consistency groups is journaled in the first 16a and second 16b journals. In response to this query, the first 6a and second 8a replication managers may communicate with (or receive from) (at blocks 112a and 112b) the first 50 and second 52 replication engines, respectively, to determine whether the data in the first and second consistency groups are in the first 16a and second 16b journals, respectively, i.e., determine that all the data in the consistency group has been journaled.

The first 6a and second 8a replication managers communicate (at blocks 114a and 114b) a first and second journal complete messages to the common linkage manager 4a in response to determining that the data in the first and second consistency groups are in the first 16a and second 16b journals, respectively. Upon receiving (at block 116) the first and second journal complete messages, the common linkage manager 4a issues a generic commit command to the first 6a and second 8a replication managers. In response to receiving the commit command, the first 6a and second 8a replication managers issue (at blocks 118a and 118b) commands to the first 50 and second 54 replication engines (or secondary common linkage manager) to commit data in the first and second consistency groups in the first 16a and 16b journals, respectively, to the first 18a and second 18b target storages, respectively. The replication engines 50 and 54 may use different techniques to commit data in the journals 16a and 16b. The first 6a and second 8a replication managers return (at blocks 120a and 120b) commit complete to the common linkage manager 4a in response to receiving commit complete from the first 50 and second 52 replication engines, respectively. Upon receiving (at block 122) commit complete from all the replication managers 6a, 8a to which the commit request was communicated, the common linkage manager 4a may return to block 100 in FIG. 4 to create a subsequent consistency group.

With the described embodiments, replication vendors may have their replication engines integrated into a heterogeneous replication engine environment by providing vendor specific replication managers that may receive the generic replication engine commands from the common linkage manager 4a, 4b and, in turn, implement the corresponding vendor specific replication engine commands needed to carry out the requested generic replication engine command at the vendor specific replication engine.

Figure 6:
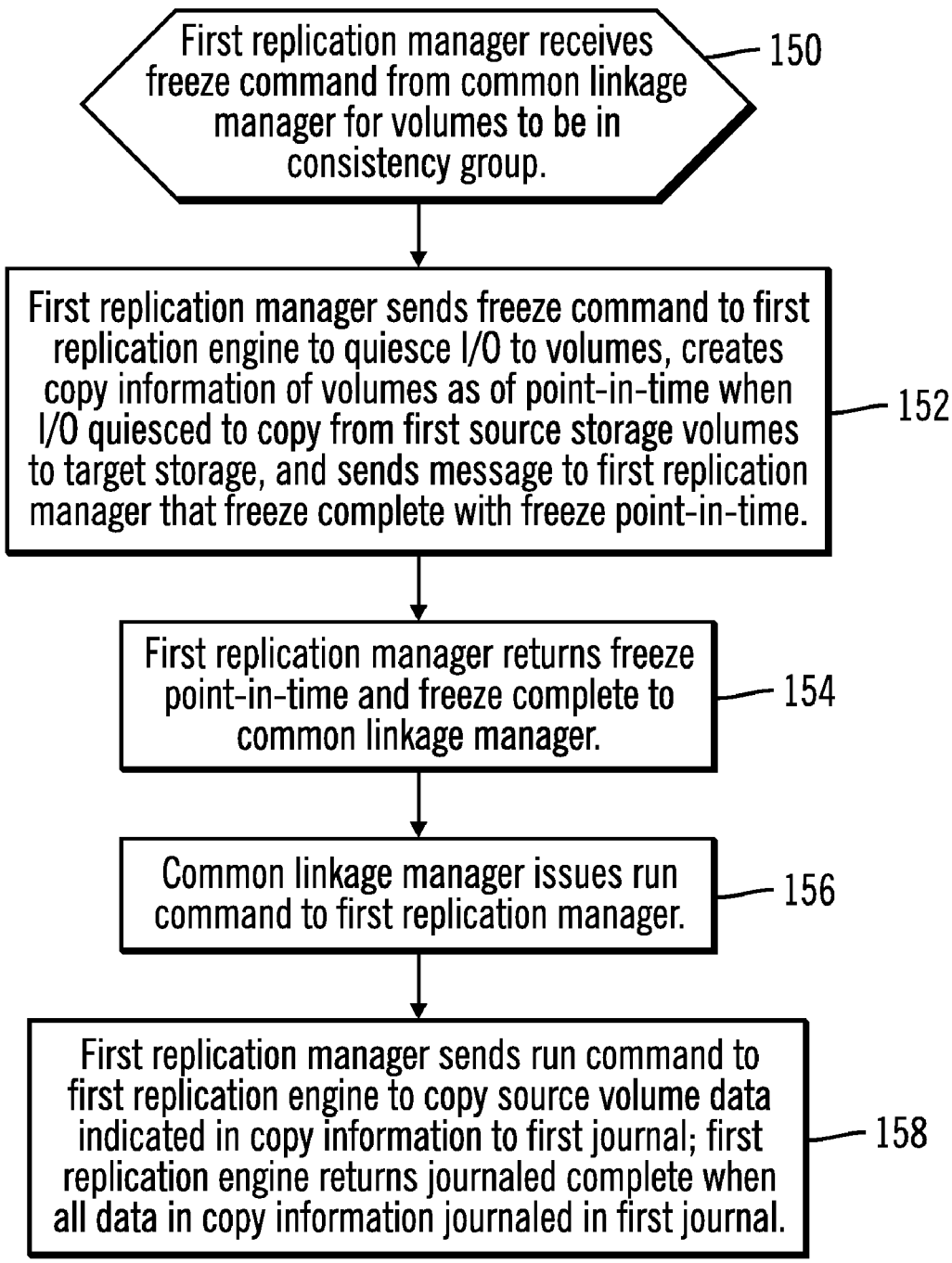
FIGS. 6, 7, 8, 9, 10, and 11 illustrate embodiments of operations of different replication engines to form consistency groups.
Figure 7:
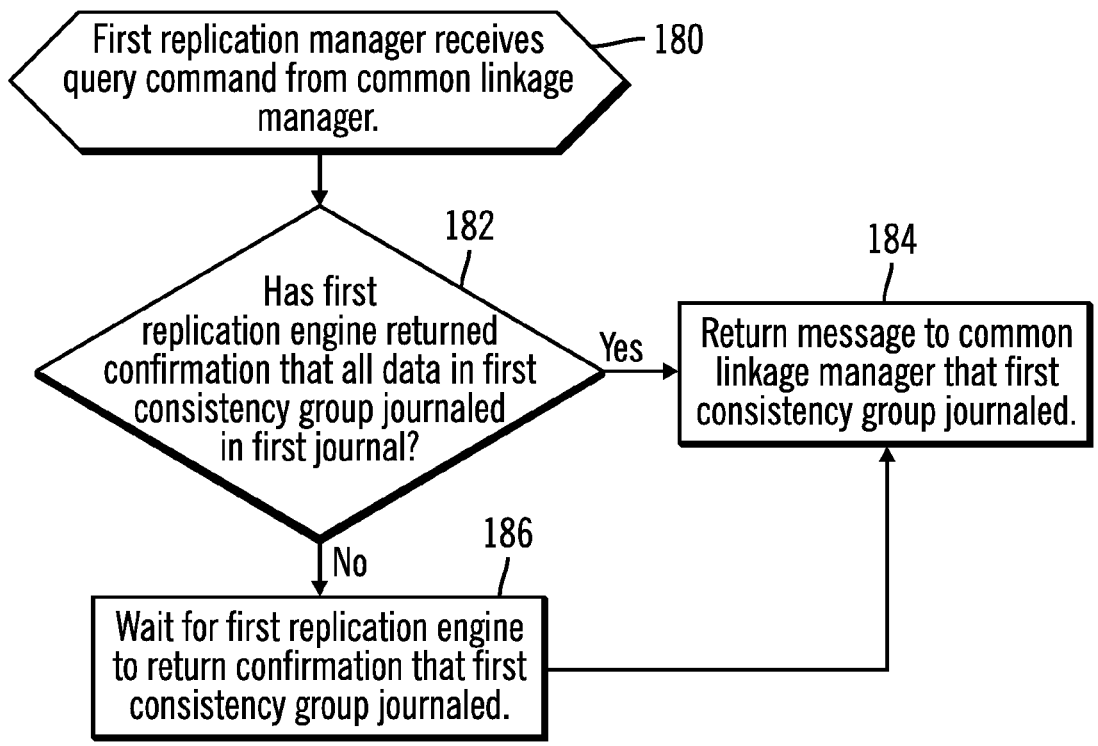
Figure 8:
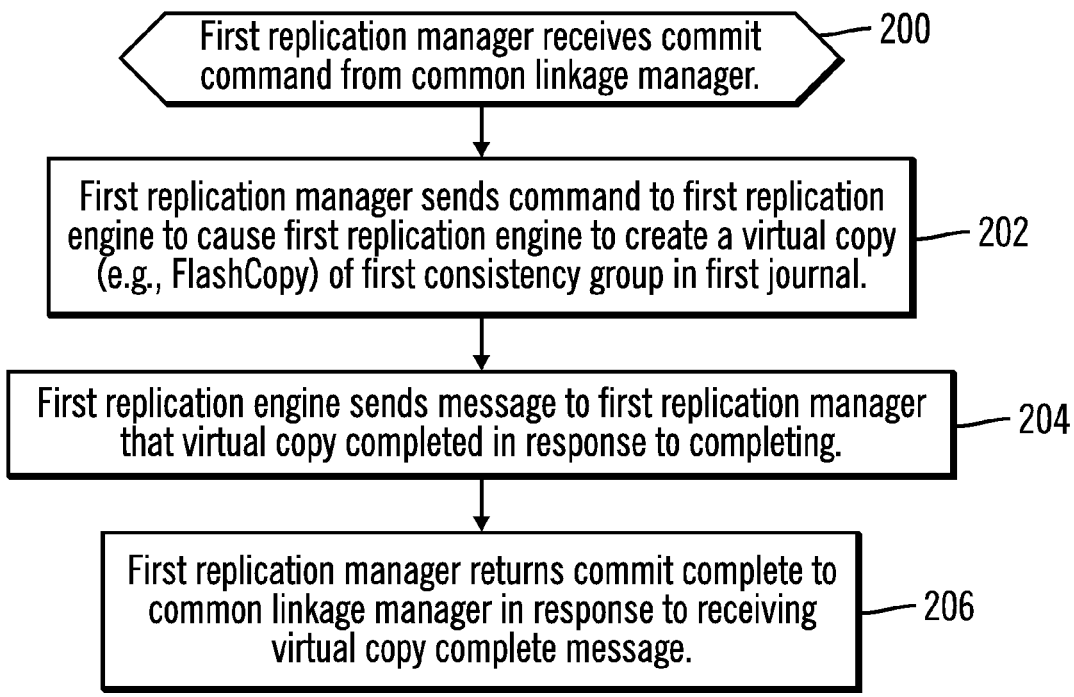

In one embodiment, the common linkage manager 4a, 4b may issue freeze and run commands to create a new consistency group. In such embodiments, the freeze and run commands correspond to the generic prepare and create consistency group operations described with respect to FIG. 4. FIGS. 6, 7, and 8 illustrate an embodiment of operations performed by the first replication manager 6a to implement the prepare and create replication commands using freeze and run commands. The generic prepare and create commands may be implemented with different commands than freeze and run.

With respect to FIG. 6, the first replication manager 6a receives (at block 150) a freeze command from the common linkage manager 4a for volumes in the first source storage 14a to be in a new consistency group. The freeze command corresponds to the generic prepare to form a consistency group command. In response to the freeze command, the first replication manager 6a sends (at block 152) a freeze command to the first replication engine 50 to quiesce I/O to the volumes in the consistency group being formed, creates copy information 54 of the volumes as of a point-in-time when the I/O is quiesced to copy from the first source storage 14a volumes to target storage, and sends a message to the first replication manager that the freeze completed with a freeze point-in-time. The first replication manager 6a may return (at block 154) a freeze point-in-time and freeze complete to the common linkage manager 4a, where the freeze point-in-time is the point-in-time of the consistency group to form.

The common linkage manager 4a issues (at block 156) a run command to the first replication manager 6a. In response, the first replication manager 6a sends (at block 158) a run command to the first replication engine 50 to copy the source volume data indicated in the copy information 56, such as an out-of-synch bitmap, to the first journal 16a. The first replication engine 6a may return journaled complete when all the data in the copy information 56, i.e., the data in the consistency group being formed, is journaled in the first journal 16a.

With respect to FIG. 7, the first replication manager 6a receives (at block 180) a generic query command from the common linkage manager 4a. If (at block 182) the first replication manager 6a has received confirmation from the first replication engine 50 that all the data in the first consistency group is journaled, then the first replication manager 6a returns (at block 184) a message to the common linkage manager 4a that the first consistency group is journaled. Otherwise, the first replication manager 6a waits (at block 186) for the first replication engine 50 to return confirmation that the first consistency group journaled. In an alternative embodiment, the first replication manager 6a may actively query the first replication engine 50 and copy information 54 to determine if all indicted data in the first consistency group has been journaled.

With respect to FIG. 8, the first replication manager 6a receives (at block 200) a generic commit command from the common linkage manager 4a. In response, the first replication manager 6a sends (at block 202) a command to the first replication engine 50 to cause the first replication engine 50 to create a virtual copy (e.g., FlashCopy®) of the first consistency group in the first journal 16a to the first target storage 18a. (FlashCopy is a registered trademark of International Business Machines, Corp. in the United States and foreign countries) A virtual copy or FlashCopy maintains a bitmap indicating tracks in the copy relationship. If any attempt is made to update a track in the first journal 16a indicated in the virtual copy relationship 54, then the data in the track as of the point-in-time of the virtual copy is copied to the first target storage 18a before being updated with the new data. The first replication engine 6a sends (at block 204) a message to the first replication manager 6a that the virtual copy completed in response to creating the virtual copy data structures used to indicate data that is in the virtual copy relationship. The first replication manager 6a, in turn, returns (at block 206) commit complete to the common linkage manager 4a in response to receiving a virtual copy complete message from the first replication engine 6a.

With the described embodiments of FIGS. 6, 7, and 8, the first replication manager 6a translates the common linkage manager 4a generic replication commands, such as the prepare command, to vendor specific replication engine commands implementing a consistency interval replication method. In this embodiment, the first replication engine does not indicate ready to prepare again until the "journal" is committed.

Figure 9:
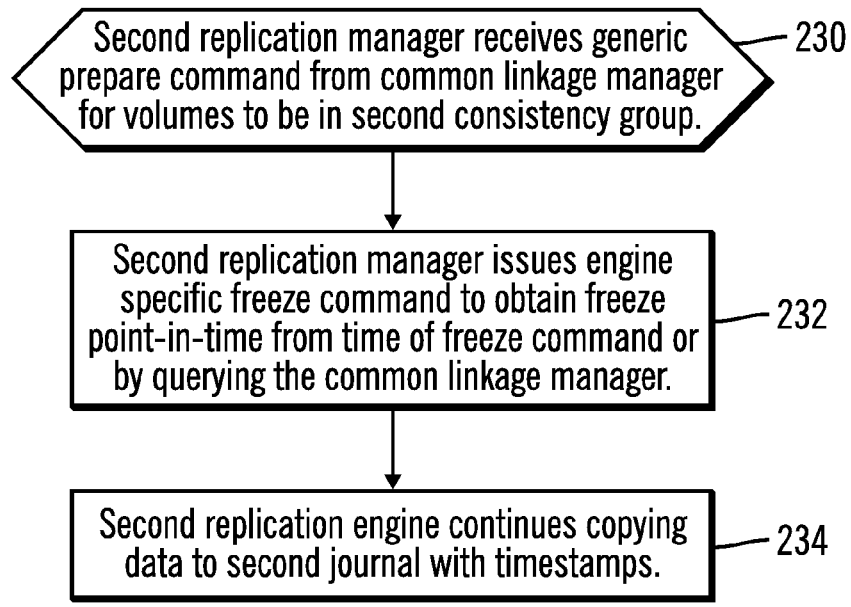
Figure 10:
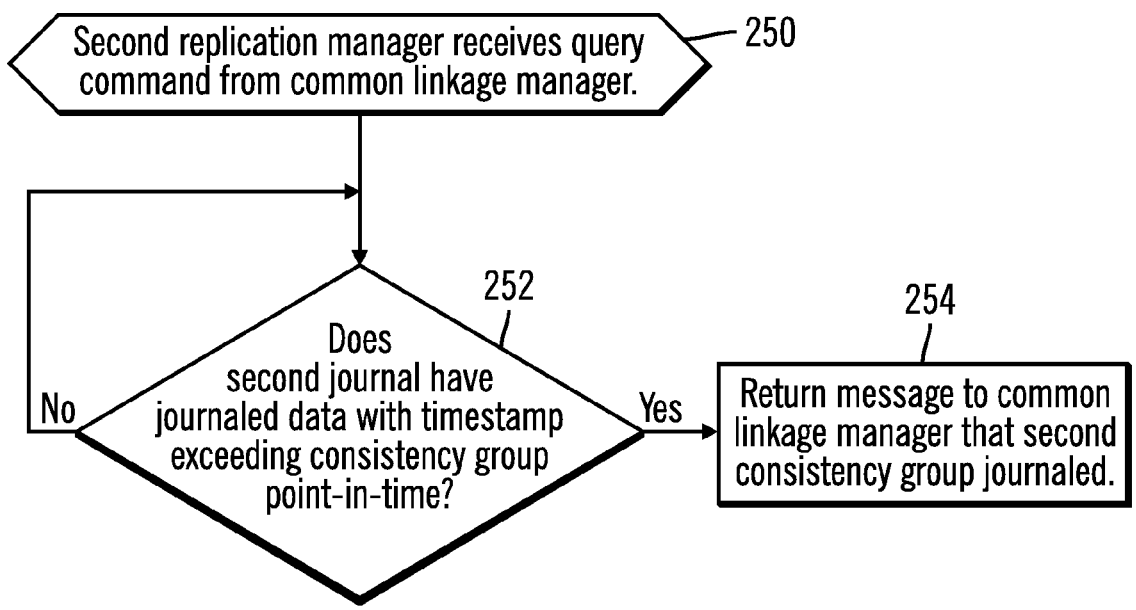
Figure 11:
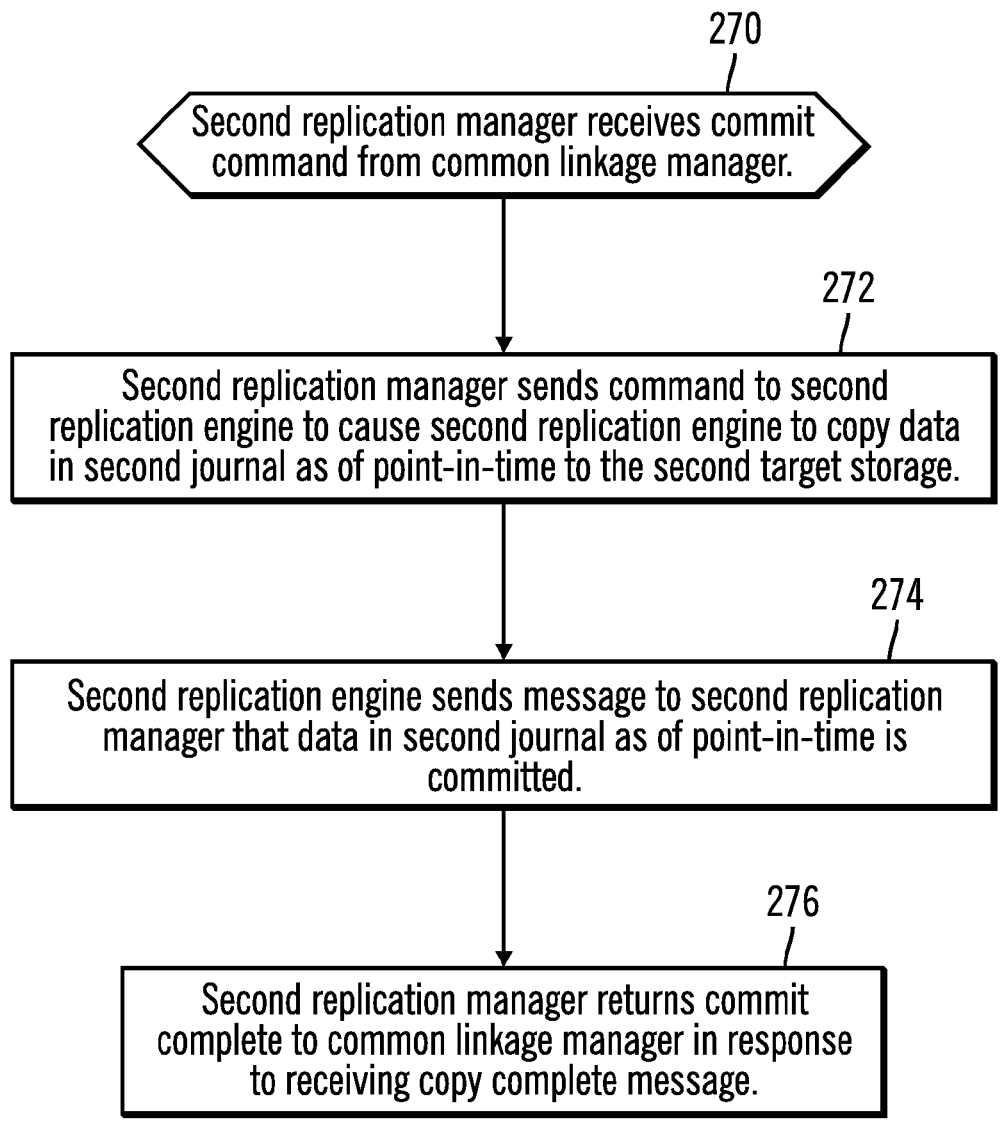

FIGS. 9, 10, and 11 illustrate an embodiment of operations performed by the second replication manager 8a to implement generic replication commands from the common linkage manager 4a, 4b for a specific timestamp replication method. With respect to FIG. 9, the second replication manager 8a receives (at block 230) a generic prepare command from the common linkage manager 4a for volumes in the second source storage 14b to be in a second consistency group. In response, the second replication manager 8a issues the specific freeze command to obtain (at block 232) a freeze point-in-time, which is the consistency group point-in-time, from the time of the freeze command or by querying the common linkage manager 4a. At this point, the second replication manager 8a does not perform any specific operation to implement the freeze command for the second replication engine 52. The second replication engine 52 continues (at block 234) copying data in the consistency group for the second source storage 14*b* to the second journal 16*b* with the timestamps for the data in time sequential order. Thus, the second journal 16*b* may be journaling data in the second consistency group as of the determined point-in-time and data having timestamps exceeding the point-in-time for the consistency group being formed.

In a further embodiment, the second replication engine 52 may ignore the Create (or the Prepare/Freeze) command from the common linkage manager 4*a* if it doesn't apply.

With respect to FIG. 10, the second replication manager 8*a* receives (at block 250) a generic query command from the common linkage manager 4*a*. If (at block 252) the second replication manager 8*a* determines that the second journal 16*b* has journaled data with a timestamp exceeding the consistency group (freeze) point-in-time, then there is no more data for the second consistency group to journal and the second replication manager 8*a* returns (at block 254) a message to the common linkage manager 4*a* that the second consistency group is journaled in the second journal 16*b*. If (at block 252) the second replication manager 8*a* has not yet determined that all the data of the second consistency group is journaled in the second journal 16*b*, then the second replication manager 8*a* continues to check for when the second consistency group has been journaled.

With respect to FIG. 11, the second replication manager 8*a* receives (at block 270) a generic commit command from the common linkage manager 4*a*. In response, the second replication manager 8*a* sends (at block 272) a command to the second replication engine 52 to cause the second replication engine 52 to copy the data in the second journal 16*b* as of the second consistency group point-in-time to the second target storage 18*b*. Upon completing the commit from the second journal 16*b*, the second replication engine 52 sends (at block 274) a message to the second replication manager 8*a* that the data in the second journal 16*b* as of the consistency group point-in-time is committed. In response, the second replication manager 8*a* returns (at block 276) commit complete to the common linkage manager 4*a*.

With the described embodiments of FIGS. 9, 10, and 11, the second replication manager 8*a* translates the common linkage manager 4*a* generic replication commands to vendor specific replication engine commands implementing a timestamp replication method.

With the described embodiments, by providing a common consistency group control across vendor specific replication engines using different replication methods, the common linkage manager 4*a*, 4*b* and replication managers 6*a*, 6*b*, 8*a*, 8*b* are able to form consistency groups across heterogeneous replication engines that use different replication technologies. This allows a consumer to deploy heterogeneous replication engines in an integrated storage environment and utilize the heterogeneous replication engines to provide consistency groups that are consistent as of a common point-in-time.

Figure 12:
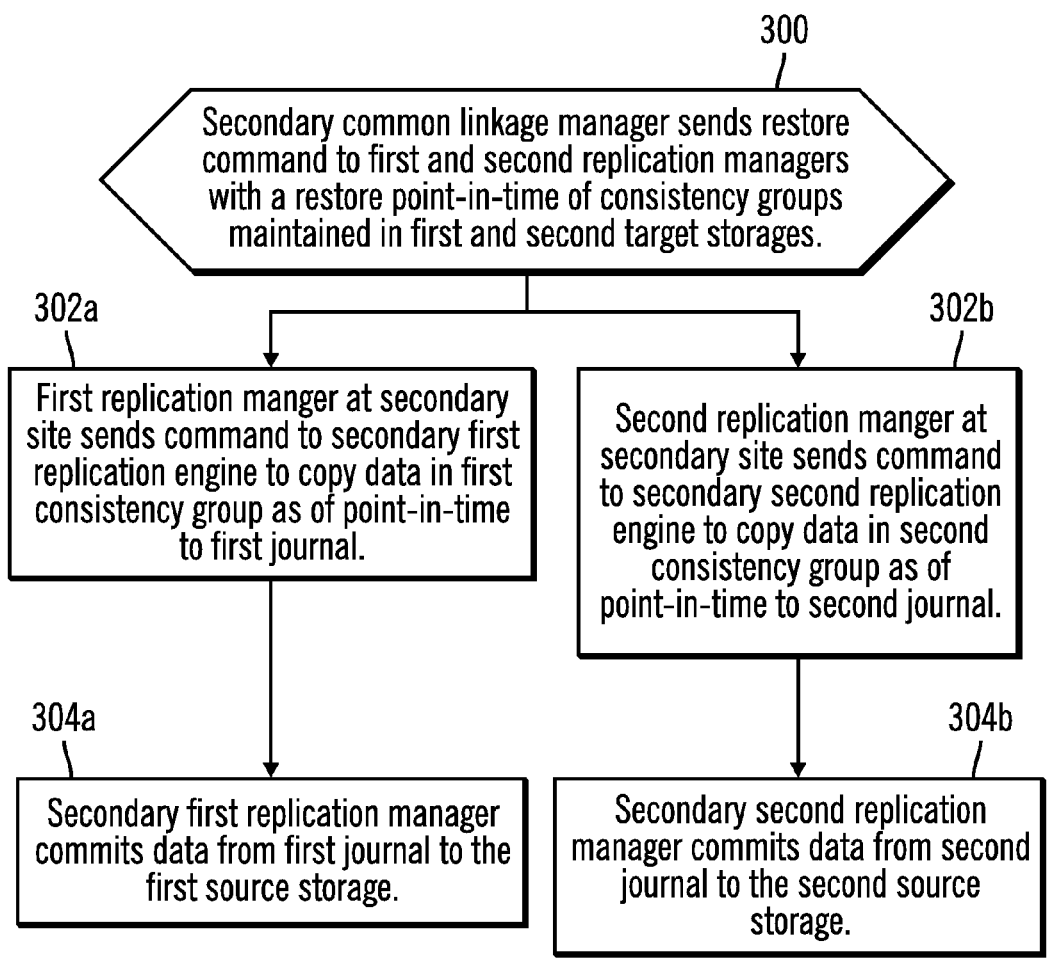
FIG. 12 illustrates embodiments of operations to restore a consistency group.

FIG. 12 illustrates an embodiment of operations for the common linkage managers 4*a*, 4*b* to perform a restore operation to restore a consistency group of data in the first 18*a* and second 18*b* target storage having a common point-in-time to the corresponding first 14*a* and second 14*b* source storage. The secondary common linkage manager 4*b* sends (at block 300) a restore command to the first 6*b* and second replication managers 8*b* with a restore point-in-time of consistency groups maintained in first 18*a* and second 18*b* target storages. In response to the restore command, the first 6*b* and second 8*b* replication mangers at the secondary manager 2*b* send (at block 302) vendor specific replication engine commands to a first 50 and second 52 replication engines implemented in the first 10*b* and second 12*b* secondary controllers, respectively, to cause the first 50 and second 52 replication engines to copy data in the first and second consistency groups having the common point-in-time to the first 16*a* and 16*b* journals. The first 6*b* and second 8*b* replication managers may then control (at block 304) their respective replication engines 50 and 52 to commit data from the first 16*a* and second 16*b* journal to the first 14*a* and second 14*b* source storages.

In one embodiment, a failover may be performed from the primary site to the secondary site if there is a failure at the primary components 10*a*, 12*a*, 2*a*. In such case, the secondary components 2*b*, 10*b*, 12*b* may receive application I/Os while the primary site is down. Upon the primary site recovering, a restore operation may be performed to restore the primary storages 14, 14*b* to the recent consistency groups formed at the secondary site.

FIGS. 13, 14, 15*a*, 15*b*, 16*a*, 16*b*, 17, 18, 19*a*, 19*b*, 19*c*, 20*a*, 20*b*, 21*a*, 21*b*, 21*c*, 22*a*, and 22*b* provide an alternative embodiment of operations to maintain consistency across heterogeneous replication storage systems at primary and secondary sites.

Figure 13:
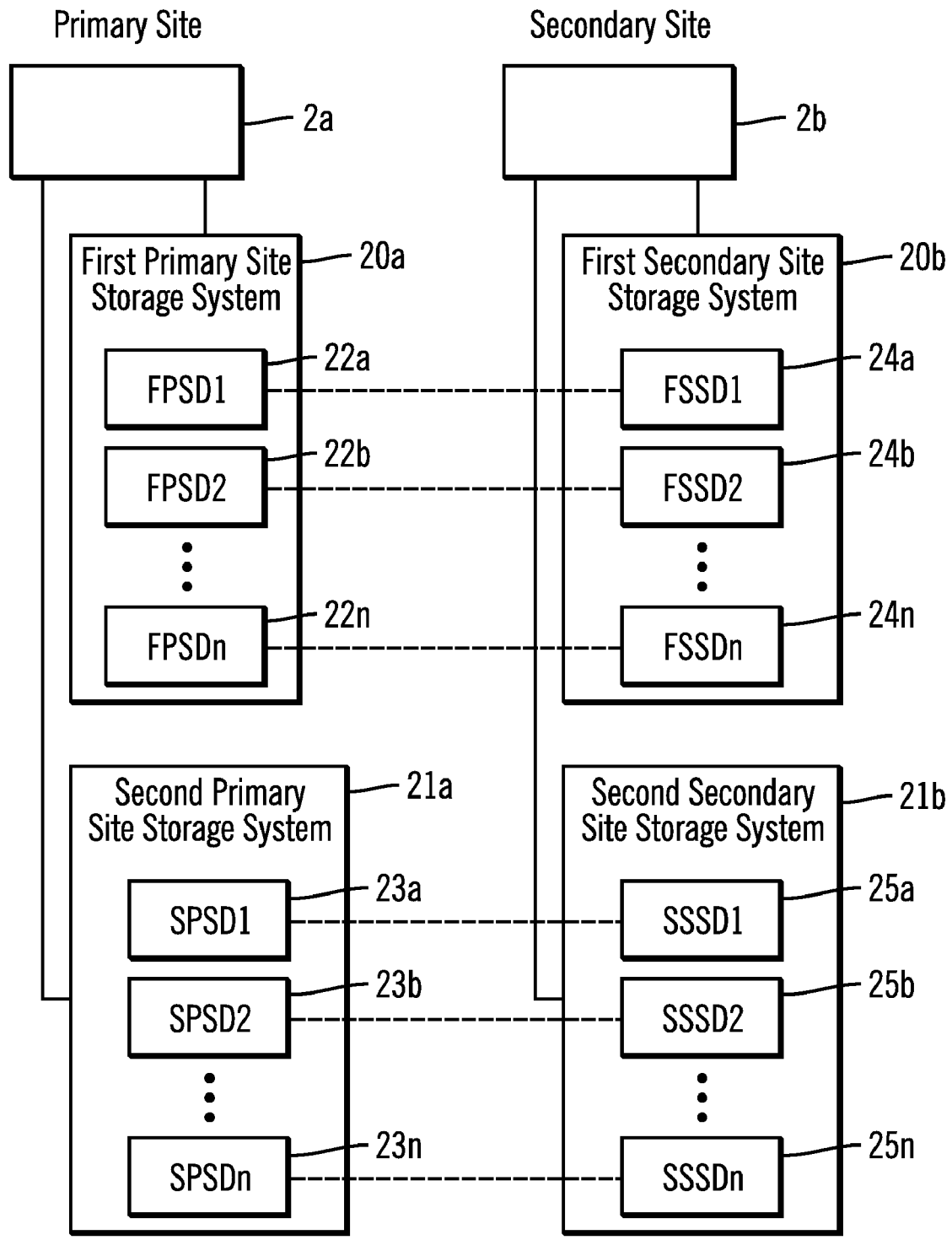
FIG. 13 illustrates an embodiment of a computing environment.

FIG. 13 illustrates an alternative embodiment of the computing environment of FIG. 1. Primary manager 2*a* and secondary manager 2*b* each include the same components as illustrated in FIG. 1. The first replication manager 6*a* of FIG. 1 may be coupled to a first primary site storage system 20*a* and the second replication manager 8*a* of FIG. 1 may be coupled to second primary site storage system 21*a*. The first primary site storage system 20*a* includes a plurality of first primary site storage devices (FPSD1, FPSD2, . . . FPSDn) 22*a*, 22*b* . . . 22*n* forming a group. A second primary site storage system 21*a* includes a plurality of second primary site storage devices (SPSD1, SPSD2, . . . SPSDn) 23*a*, 23*b* . . . 23*n* forming a group. The first replication manager 6*b* of FIG. 1 may be coupled to a first secondary site storage system 20*b* and the second replication manager 8*b* of FIG. 1 may be coupled to a second secondary site storage system 21*b*. The first secondary site storage system 20*b* includes a plurality of first secondary site storage devices (FSSD1, FSSD2 . . . FSSDn) 24*a*, 24*b* . . . 24*n* forming a group. The second secondary site storage system 21*b* includes a plurality of second secondary site storage devices (SSSD1, SSSD2 . . . SSSDn) 25*a*, 25*b* . . . 25*n* forming a group. The first primary site storage system 20*a* and first secondary site storage system 20*b* have corresponding volumes each forming a pair.

The second primary site storage system 21*a* and second secondary site storage system 21*b* also have corresponding volumes each forming a pair. Between the primary site and the secondary site, data replication is performed maintaining consistency among the groups though the two systems use different remote copy methods for keeping consistency within the groups. The first storage system 20*a*, 20*b* may implement a single cycle from receiving write data from the host, sending the data to the secondary remote site using a bitmap, and applying the data from a volume to an another volume in the secondary site even if first storage system 20*a*, 20*b* is not controlled by the common linkage manager. On the other hand the second storage system 21*a*, 21*b* may implement different cycles at the primary site and the secondary site if it is not controlled by the common linkage manager. In this way, the first storage system 20*a*, 20*b* may have only one generation in a cycle, and the second storage system 21*a*, 21*b* may mix multiple generations in a cycle if the different systems are operated independently without the phase control by the common linkage manager.

Figure 14A:
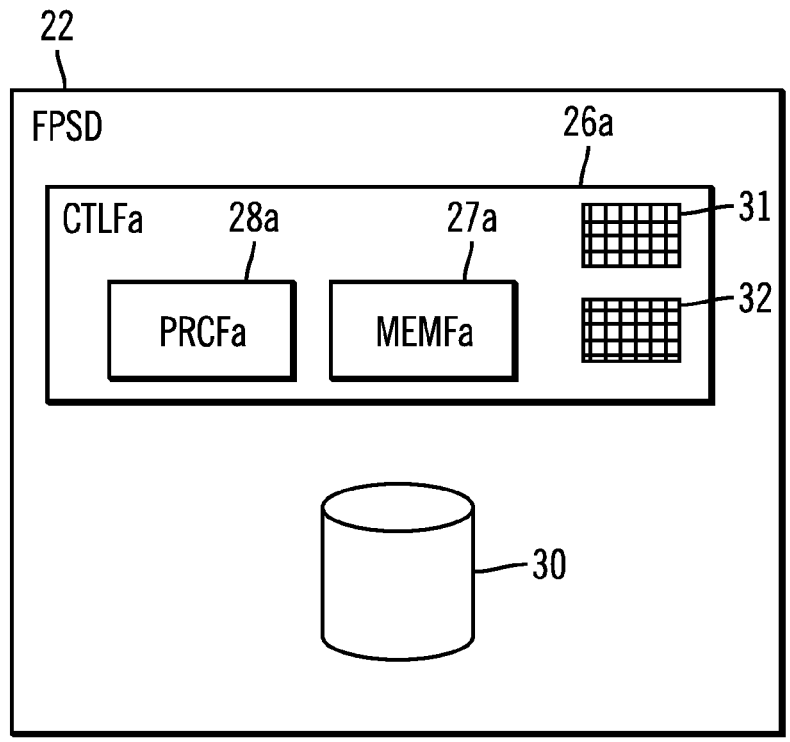
FIGS. 14a and 14b illustrate an embodiment of storage systems of primary and secondary sites in First Storage System.

FIG. 14a illustrates components of a first primary site storage device (FPSD) 22, such as one of FPSDs 22a, 22b . . . 22n in FIG. 13. Each first primary site storage device (FPSD) 22 includes a storage controller (CTLFa) 26a and a storage volume 30. The storage controller (CTLFa) 26a controlling the operation of the first primary site storage device (FPSD) 22, includes a memory (MEMFa) 27a and a processor (PRCFa) 28a to execute programs stored in the memory 27a, and two bit maps 31,32. The memory MEMFa 27a stores programs, control information, and read/write data for caching. The storage volume 30 may be comprised of plurality of disk drives, such as hard disk drives (HDDs).

Figure 14B:
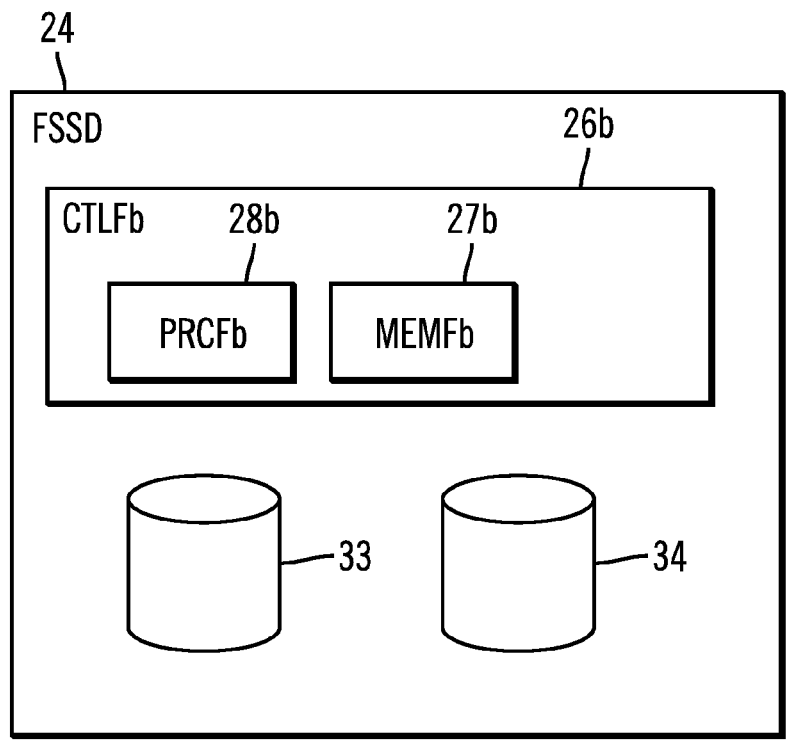

FIG. 14b illustrates components of a first secondary site storage device (FSSD) 24, such as one of FSSDs 24a, 24b . . . 24n in FIG. 13. Each first secondary site storage device (FSSD) 24 may include a storage controller (CTLFb) 26b and storage volumes 33, 34. The storage controller (CTLFb) 26b controlling the operation of the first secondary site storage device (FSSD) 24, includes a memory (MEMFb) 27b, and a processor (PRCFb) 28b to execute programs stored in the memory 27b. The memory (MEMFb) 27b stores programs, control information, and read/write data for caching. The storage volumes 33,34 may be comprised of a plurality of disk drives, such as hard disk drives (HDDs). Storage volumes 30,34 may be accessed from the hosts and storage volume 33 may be used for receiving data from the primary site.

Figure 15A:
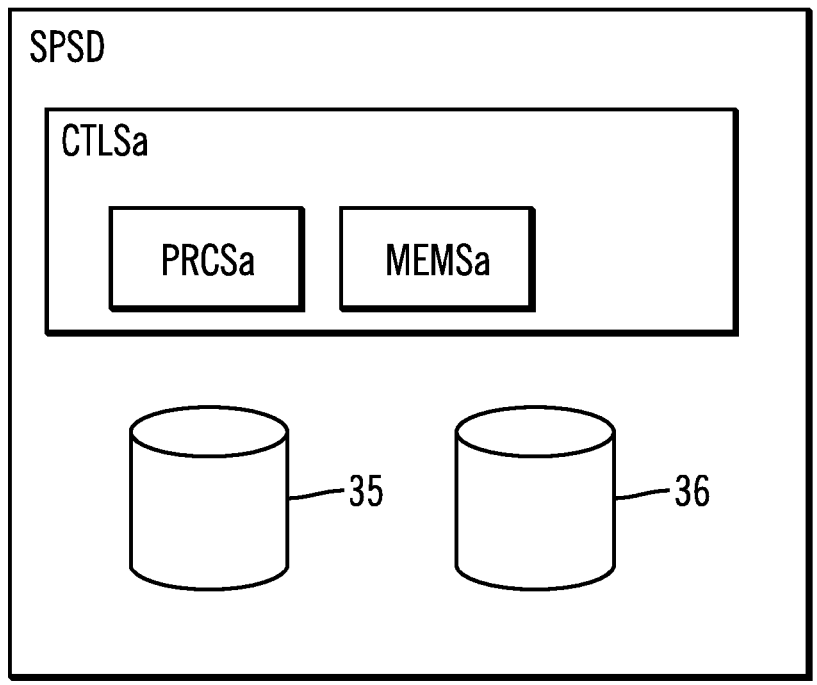
FIGS. 15a and 15b illustrate an embodiment of storage systems of primary and secondary sites in Second Storage System.

FIG. 15a illustrates components of a second primary site storage device (SPSD) 23, such as one of SPSDs 23a, 23b . . . 23n in FIG. 13. Each second primary site storage device (SPSD) 23 includes a storage controller (CTLSa) 29a and storage volumes 35, 36. The storage controller CTLSa 29a controlling the operation of the Second Primary Site Storage Device (SPSD) 23, includes a memory MEMSa 39a and a processor PRCSa 40a to execute programs. The memory MEMSa 39a stores programs, control information, and read/write data for caching. The storage volumes 35,36 may be comprised of a plurality of disk drives, such as HDDs.

Figure 15B:
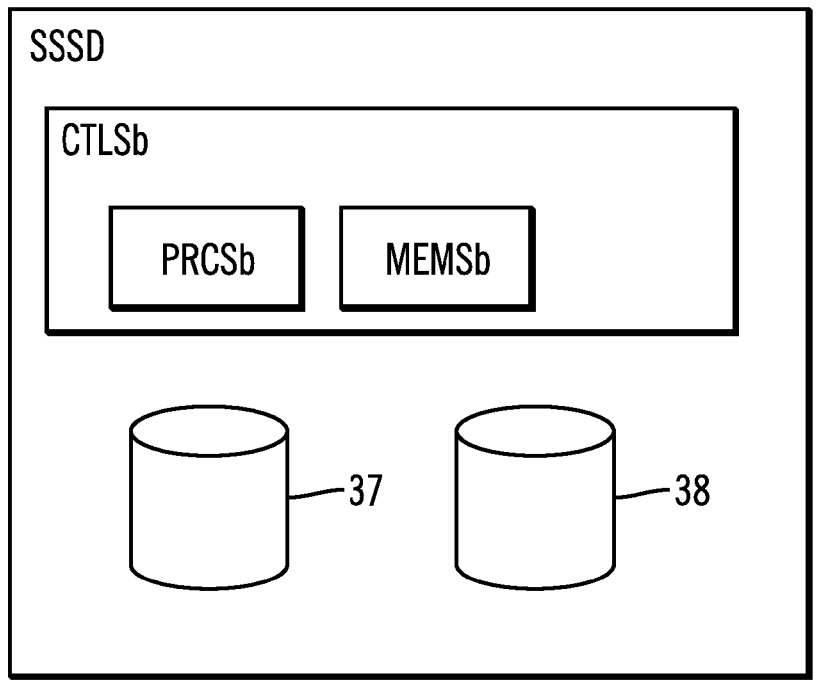

FIG. 15b illustrates components of a Second Secondary Site Storage Device (SSSD) 25, such as one of SSSDs 25a, 25b . . . 25n in FIG. 13. Each Second Secondary Site Storage Device (SSSD) 25 includes a storage controller CTLFb 29b and storage volumes 37, 38. The storage controller CTLFb 29b controlling the operation of the second secondary site storage device (SSSD) 25, includes a memory MEMFb 39b and a processor PRCFb 40b to execute programs stored in the memory 39b. The memory MEMSb 39b stores programs, control information, and read/write data for caching. The storage volumes 37, 38 may be comprised of plurality of disk drives, such as HDDs. Storage Volumes 35,38 may be used for access from the hosts and storage volume 36,37 may be used for sending and receiving data from the primary site to the secondary site.

Figure 16A:
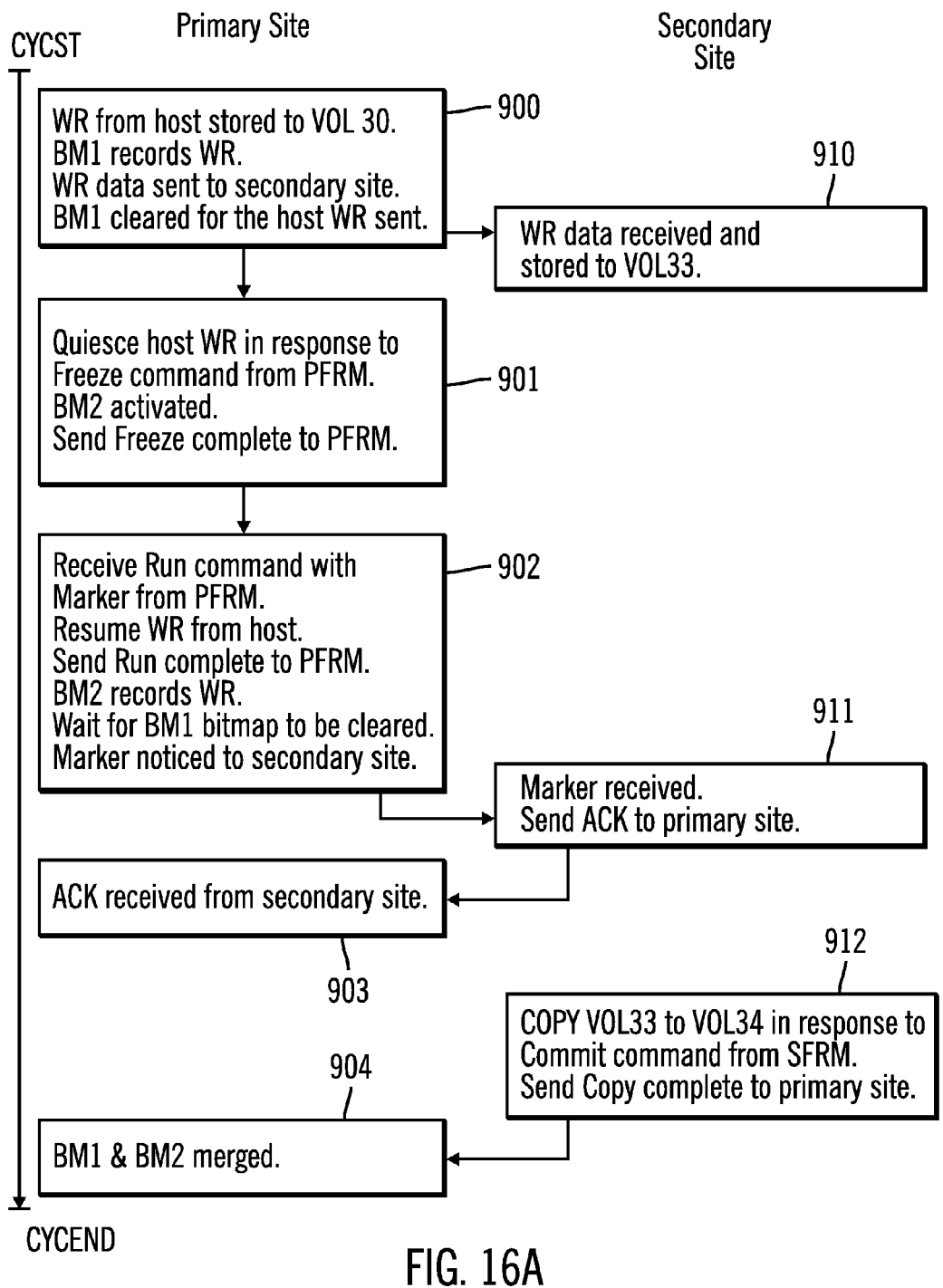
FIGS. 16a illustrate operations of First Storage System.

FIG. 16a illustrates the operation flow of each pair of first primary site storage device (FPSD) 22a, 22b . . . 2n at the primary site and first secondary site storage device (FSSD) 24a, 24b . . . 24n at the secondary site. The first primary site storage devices (FPSD) 22a, 24b . . . 24n receive (at block 900) write data (WR) from the hosts and store the data to their storage volume 30 (FIG. 14a). Bitmap 31 (BM1) records (at block 900) this write. Write data is sent to the secondary site and the corresponding bit of the bitmap 31 (BM1) is cleared (at block 900). At the secondary site, the first secondary site storage device (FSSD) 24a, 24b . . . 24n receives (at block 910) the write data (WR) sent from the primary site and stores the write data to the storage volume 33 (FIG. 14b). While the write data sending operation from the first primary site storage device (FPSD) 22a, 22b . . . 2n and the data receiving and storing operation to storage volume 33 on the first secondary site storage device (FSSD) 24a, 24b . . . 24n is continued depending on the load of the system, the write (WR) from the host is quiesced (at block 901) in response to a Freeze command from the first replication manager 6a and bitmap 32 (BM2) (FIG. 14a) in an FPSD 22a, 22b . . . 22n is activated. After the bitmap 32 (BM2) is activated, the first primary site storage device (FPSD) 22a, 22b . . . 22n sends (at block 901) a Freeze completion notice to the first replication manager 6a (PFRM). This completion notice allows the common linkage manager 4a to determine whether all the first primary site storage devices (FPSD1, FPSD2, . . . , FPSDn) 22a, 22b . . . 22n and the second primary site storage devices (SPSD1, SPSD2, . . . , SPSDn) 23a, 23b . . . 23n have finished the operation in response to the Freeze command and are prepared for the next operation (at block 901).

Next (at block 902) the first primary site storage device (FPSD) 22a, 22b . . . 2n receives a Run command with a marker from the first replication manager 6a (PFRM). A marker comprises information indicating the cycle (generation) including the data. The marker may comprise a sequential number. A cycle number is a reference number counting the cycles that the common linkage manager 4a, 4b has controlled. The marker may comprise a sequential number that is used to control the cycles of two storage systems, such as the replication managers. In response to this command (at block 902), write operations (WR) from the host are resumed and the writes are now recorded to the bitmap 32 (BM2) instead of bitmap 31 (BM1). The first primary site storage device (FPSD) 22a, 22b . . . 2n sends (at bock 902) a Run complete notice to the first replication manager 6a (PFRM) after the host is resumed and then the first primary site storage device (FPSD) 22a, 22b . . . 2n waits (at block 902) for the bitmap 31 (BM1) to be cleared, which means that all the write data received before the host write has been quiesced are sent to the secondary site.

The marker has the information of the cycle number, which is received from the first replication manager 6a (PFRM), and is sent from the primary site to the secondary site (at block 902). The processor 26b (FIG. 14b) in the first secondary site storage device (FSSD) 24a, 24 . . . 24n returns (at block 911) an acknowledgement to the primary site in response to receiving the marker and the first primary site storage device (FPSD) receives this acknowledgement (at block 903). In order to maintain consistency between the second storage system 21a, 21b and other first secondary site storage devices (FSSD) 24a,24b . . . 24n, the first secondary site storage device (FSSD) 24a, 24b . . . 24n waits for a Commit command from the first replication manager 6b (SFRM) to apply data from the storage volume 33 to storage volume 34. In this way, in response to a Commit command from the first replication manager 6b, the first secondary storage device (FSSD) 24a, 24b . . . 24n copies (at block 912) the data in the storage volume 33 to the storage volume 34. After the copy is completed, complete notice is sent (at block 912) to the primary site (at block 912) so that the first primary site storage device (FPSD) 22a, 22b . . . 2n may merge (at block 904) the two bitmaps 31, 32 (BM1, BM2) (FIG. 14a) and end the cycle (CYCEND). These operations (from CYCST to CYCEND) are continued sequentially during normal system operations.

In this embodiment, the first storage system 20a uses two bitmaps and one storage volume in the primary site. The first storage system 20b uses two storage volumes in the secondary site, but may use two cache slots or a storage volume instead of bitmaps, such as used at the primary site or may use two bitmaps instead of a storage volume 33, 34 for receiving data from the primary site at the secondary site.

Figure 16B:
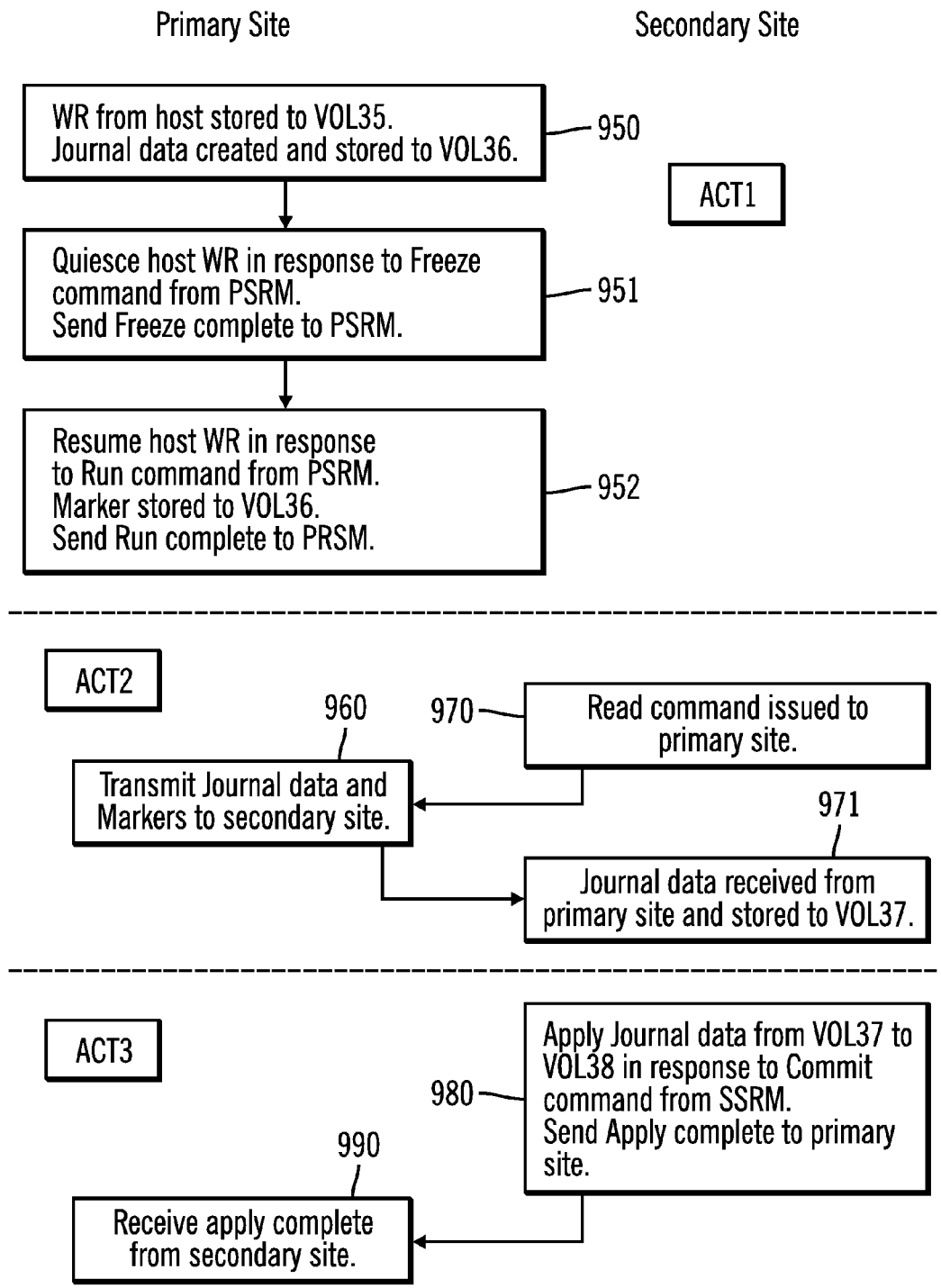
FIGS. 16b illustrate operations of Second Storage System.

FIG. 16b illustrates the operation flow of each pair of second primary site storage device (SPSD) 23a, 23b . . . 23n at the primary site and second secondary site storage device (SSSD) 25a, 25b . . . 25n at the secondary site. The second storage system 21a, 21b does not operate in a single cycle. It has multiple cycles (ACT1,ACT2,ACT3), which could operate independently and concurrently. In ACT1, the second primary site storage device (SPSD) 23a,23b . . . 23n receives write data (WR) from the host and stores the data to the storage volume 35. Journal data including write data (WR) received from the host and information on the order or the writes, such as time information or a sequential number, are stored to the storage volume 36 under the control of the processor 29a of the second primary site storage device (SPSD) 23a, 23b . . . 23n (at block 950). If the host coupled to the second primary site storage device (SPSD) 23a, 23b . . . 23n is a mainframe type, then the timestamp attached to the write data received from the host could be used for the time information. If the host coupled to the second primary site storage device (SPSD) 23a, 23b . . . 23n is an open system type, time information may not be attached to the write data from the host, and a timer inside the second primary site storage device (SPSD) 23a, 23b . . . 23n may be used to provide the time information.

In response to a Freeze command from the Second Replication Manager 8a (PSRM) write from the host is quiesced (at block 951). After the host is quiesced (at block 951) the controller CTLSa 29a of the second primary site storage device (SPSD) 23a, 23b . . . 23n sends a Freeze complete notice to the second replication manager 8a (PSRM). The common linkage manager 4a (PFRM) can determine whether all of the first primary site storage devices (FPSD1, FPSD2, . . . , FPSDn) 22a, 22b . . . 22n and the second primary site storage devices (SPSD1, SPSD2, . . . , SPSDn) 23a, 23b . . . 23n have finished the operation in response to the Freeze command and are prepared for the next operation (at block 951).

Next the second primary site storage device (SPSD) 23a, 23b . . . 23n receives (at block 952) a Run command with a marker from the second replication manager 8a (SFRM). In response to this command the write operations from the host are resumed and the marker received from the second replication manager 8a (PSRM) is stored (at block 952) to the storage volume 36. The marker may be modified to adjust the form as other journal data. Then the second primary site storage device (SPSD) 23a,23b . . . 23n sends (at block 952) a Run complete notice to the second replication manager 8a (PSRM). The operations in ACT1 (950, 951, 952) may be continued sequentially during system operations. In ACT2, the second secondary site storage device (SSSD) 25a, 25b . . . 25n issues (at block 970) a Read command to the corresponding second primary site storage device (SPSD) 23a, 23b . . . 23n at the primary site (at block 970). The Read command is conducted periodically independent of other operations (ACT1, ACT3). The time lap could be modified depending on the load of the second primary site storage device (SPSD) 23a,23b . . . 23n. In response to the Read command, the second primary site device (SPSD) 23a, 23b . . . 23n transmits (at block 960) the journal data in storage volume 36 (FIG. 15a) and the markers to the second secondary site storage device (SSSD) 25a, 25b . . . 25n to the secondary site.

The second secondary site storage device (SSSD) 25a, 25b . . . 25n stores (at block 971) the journal data received from the primary site to the storage volume 37 (FIG. 15b) of the second secondary site storage device (SSSD) 25a, 25b . . . 25n. Markers may also be read out from the storage volume 36 of the second primary site storage device 23a, 23b . . . 23n (SPSD) and stored to the storage volume 37 of the second secondary site storage device (SSSD) 25a, 25b . . . 25n. The operations in ACT2 (970, 960, 971) may be continued sequentially during system operations.

In ACT3 in response to a Commit command from the second replication manager 8b (SSRM), the second secondary site storage device (SSSD) 25a, 25b . . . 25n may apply (at block 98) the journal data in the storage volume 37 to the storage volume 38 (FIG. 15b) in the order of the journal using the time information or sequential number attached to the write data when the journal data is formed. The journal data in storage volume 37 will be applied to the storage volume 38 until the journal data including the marker, which matches the marker received from the second replication manager 8b (SSRM), is processed. The storage volume 37 may include time related information as the storage volume 36 so that journal data in both volumes could be used for Continuous Data Replication, but the storage volume 38 may be modified to have only the write data as in volume 35 (at block 980). In order to maintain consistency between the first storage system 20a,20b and other second secondary site storage devices (SSSD) 25a,25b . . . 25n, the second secondary site storage device (SSSD) 25a, 25b . . . 25n waits for the Commit command from the second replication manager 8b (SSRM) to apply data from the storage volume 37 to storage volume 38. After the applying operation is completed, the second secondary site storage device (SSSD) 25a, 25b . . . 25n sends (at block 980) a complete notice to the primary site (at block 980). The second primary site storage device (SPSD) 23a, 23b . . . 23n receives the apply complete notice (at block 990). The operations in ACT3 (980, 990) will be continued sequentially while the system is on.

Figure 17:
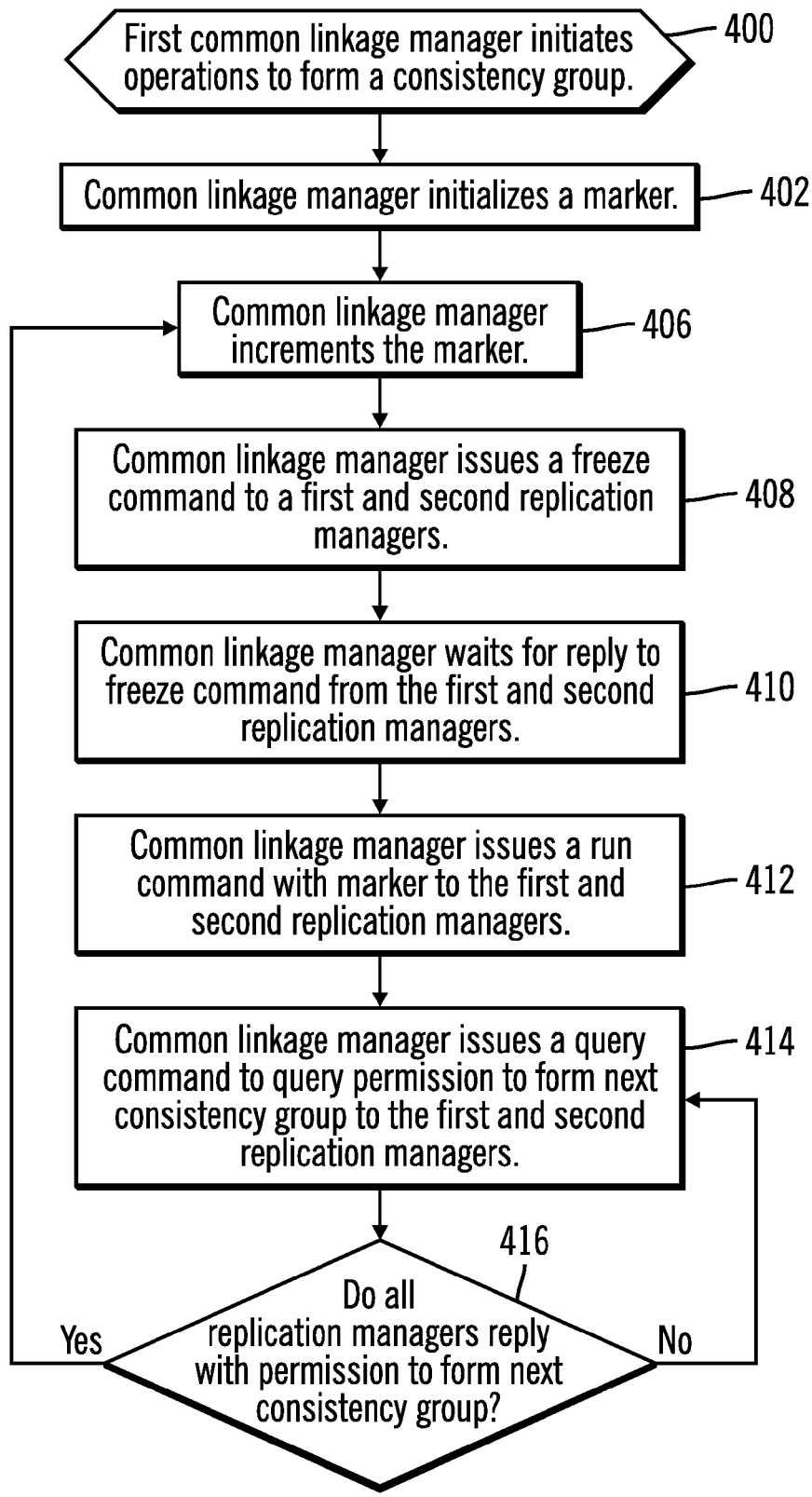
FIGS. 17 illustrates an embodiment of operations of a first common linkage manager to initiate operations to form a consistency group.

FIG. 17 illustrates operations performed by the common linkage manager 4a to control the replication managers 6b and 8b at the secondary site. Upon (at block 400) the common linkage manager 4a initiating operations to form a consistency group, the common linkage manager 4a initializes (at block 402) a marker. The common linkage manager 4a increments (at block 406) the marker and issues (at block 408) a freeze command marker to a first 6a and second 8a replication managers at the primary site. The common linkage manager 4a waits (at block 410) for a reply to the freeze command from the first 6a and second 8a replication managers and, upon receiving the response, issues (at block 412) a run command with the marker to the first 6a and second 8a replication managers. By quiescing the host operations in response to the freeze command at the storage systems and implementing a marker to the storage systems, the storage systems used can be either mainframe type or open type without having the same time information from the host because the storage systems can implement a common phase using the marker. The common linkage manager 4a issues (at block 414) a query command to query permission to form next consistency group to the first and second replication managers. If all the replication managers 6a and 8a reply with permission to form a next consistency group, then control proceeds back to block 406 to form the next consistency group. Otherwise, if permission is not provided, control proceeds back to block 412 to wait for both replication managers 6a and 8a to reply with permission to form the next consistency group.

Figure 18:
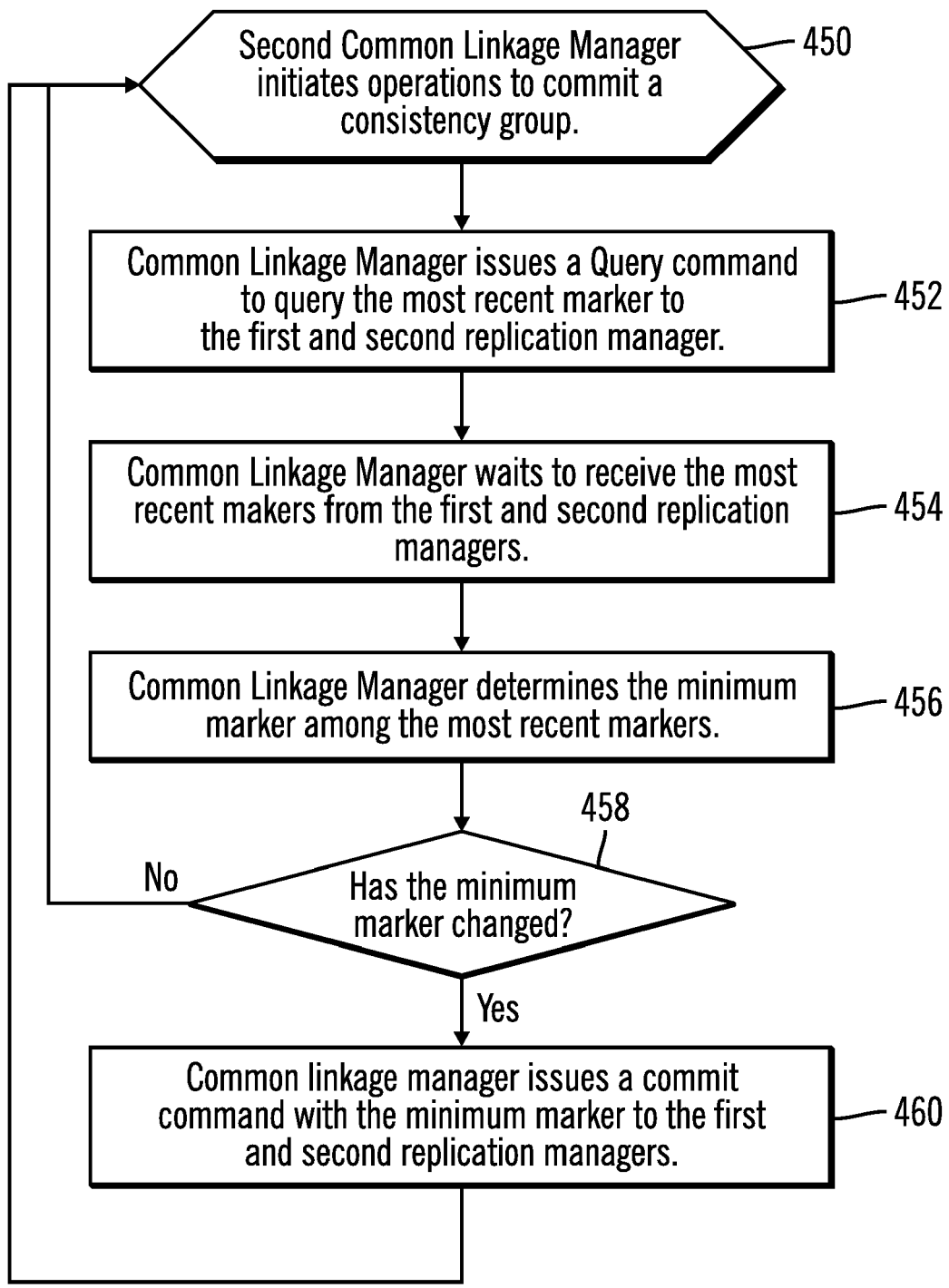
FIGS. 18 illustrates an embodiment of operations of a second common linkage manager to initiate operations to form a consistency group.

FIG. 18 illustrates an embodiment of operations performed by the common linkage manager 4b to control the replication managers 6b and 8b at the secondary site. Upon the secondary common linkage manager 4b initiating (at block 450) an operation to commit a consistency group, the common linkage manager 4b issues (at block 452) a query command to query the most recent marker from each first secondary site storage device (FSSD) 24a, 24b . . . 24n and each second secondary site storage device (SSSD) 25a, 25b . . . 25n to the first 6b and second 8b replication managers. The common linkage manager 4b waits (at block 454) to receive the most recent markers from the first 6b and second 8b replication managers and determines (at block 456) the minimum marker among the most recent markers. If (at block 458) the minimum marker has changed, then the common linkage manager 4b issues (at block 460) a commit command with the minimum marker to the first 6b and second 8b replication managers. Otherwise, if the minimum marker has not changed (at block 458), then control proceeds back to block 450. Further, after issuing the commit command (at block 460), the common linkage manager 4b would return to block 450.

Figure 19A:
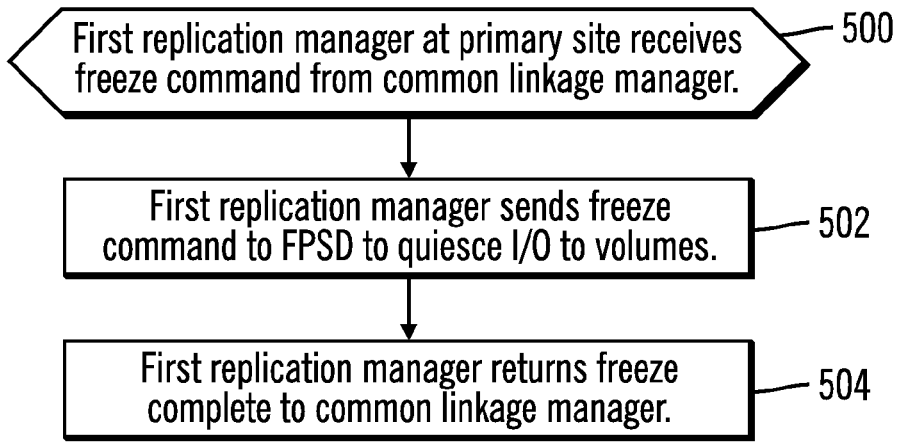
FIG. 19a illustrates an embodiment of a first replication manager at a primary site to process a freeze command.

FIG. 19a illustrates an embodiment of operations performed by the first replication manager 6a at the primary site to process the freeze command from the common linkage manager 4a. Upon the first replication manager 6a at the primary site receiving (at block 500) a freeze command from common linkage manager 4a, the first replication manager 6a sends (at block 502) the freeze command to each controller CTLFa 26a in the first primary site storage device (FPSD) 22a, 22b . . . 22n. In response to this command, the controller CTLFa 26a quiesces I/O to the volumes in the source storage 30, and sends a message to the first replication manager 6a that freeze is complete with a freeze point-in-time. The first replication manager 6a returns (at block 504) a freeze complete message to the common linkage manager 4a after all the freeze complete messages are received by the first replication manager 6a.

Figure 19B:
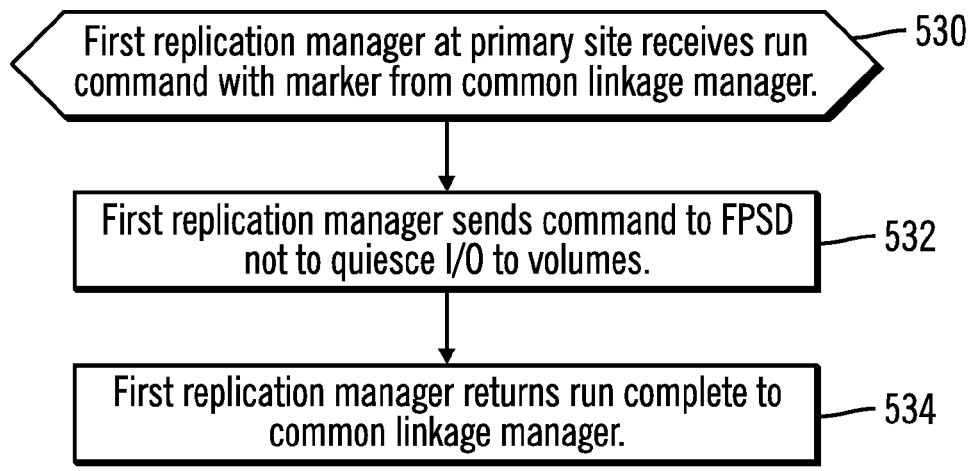
FIG. 19b illustrates an embodiment of a first replication manager at a primary site to process a run command.

FIG. 19b illustrates an embodiment of operations performed by the first replication manager 6a at the primary site to process run command from the common linkage manager 4a. Upon the first replication manager 6a at the primary site receiving (at block 530) a run command with the marker from the common linkage manager 4a, the first replication manager 6a sends (at block 532) a command to the first primary site storage device (FPSD) 26a, 26b . . . 26n not to quiesce I/O to the volumes and resume host I/O operations in the source storage 30. The first replication manager 6a returns (at block 534) run complete to the common linkage manager 4a after all the run complete messages are received by the first replication manager 6a.

Figure 19C:
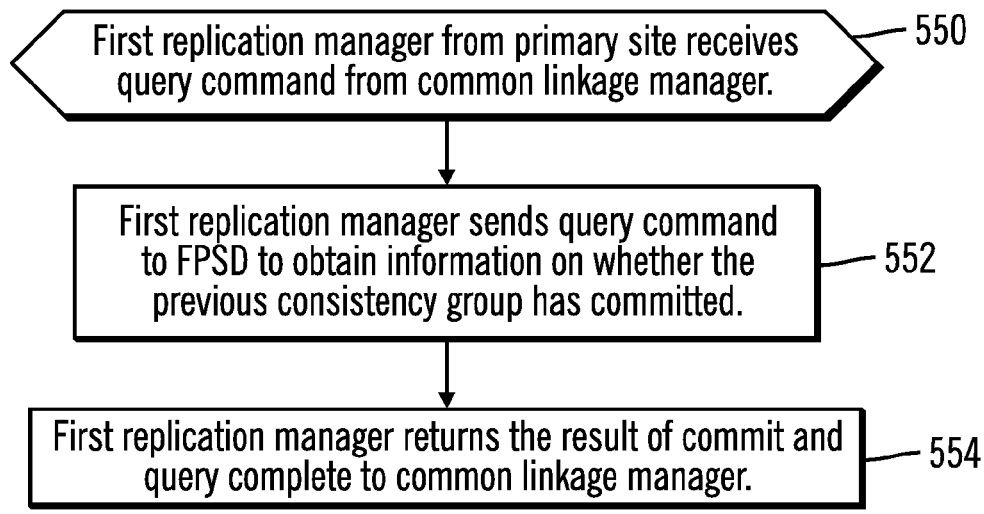
FIG. 19c illustrates an embodiment of a first replication manager at a primary site to process a query command.

FIG. 19c illustrates an embodiment of operations performed by the first replication manager 6a at the primary site to process a query command from the common linkage manager 4a. Upon receiving (at block 550) query command from the common linkage manager 4a, the first replication manager 6a at the primary site sends (at block 552) a query command to each first primary site storage device (FPSD) 26a, 26b . . . 26n to obtain information on whether the previous consistency group has committed. Each first primary site storage device (FPSD) 26a, 26b . . . ,26n returns acknowledgment that the group has been committed if it has received Copy complete from the secondary site as illustrated in block 912 and has merged the two bitmaps (BM1, BM2) 31, 32 (FIG. 14a) in block 904, and will return that the group has been not been committed if it has not merged the two bitmaps 31,32 or not return a response until it merged the two bitmaps (BM1, BM2) in block 904. The first replication manager 6a returns (at block 554) the gathered result of the commit from all the first primary site storage device (FPSD) 22a, 22b . . . 22n and query complete to the common linkage manager 4a. So unless all the first primary site storage devices (FPSD1, FPSD2, . . . , FPSDn) 22a, 22b . . . 22n are committed the first replication manager 6a will return to the common linkage manager that the previous consistency group has not been committed.

Figure 20A:
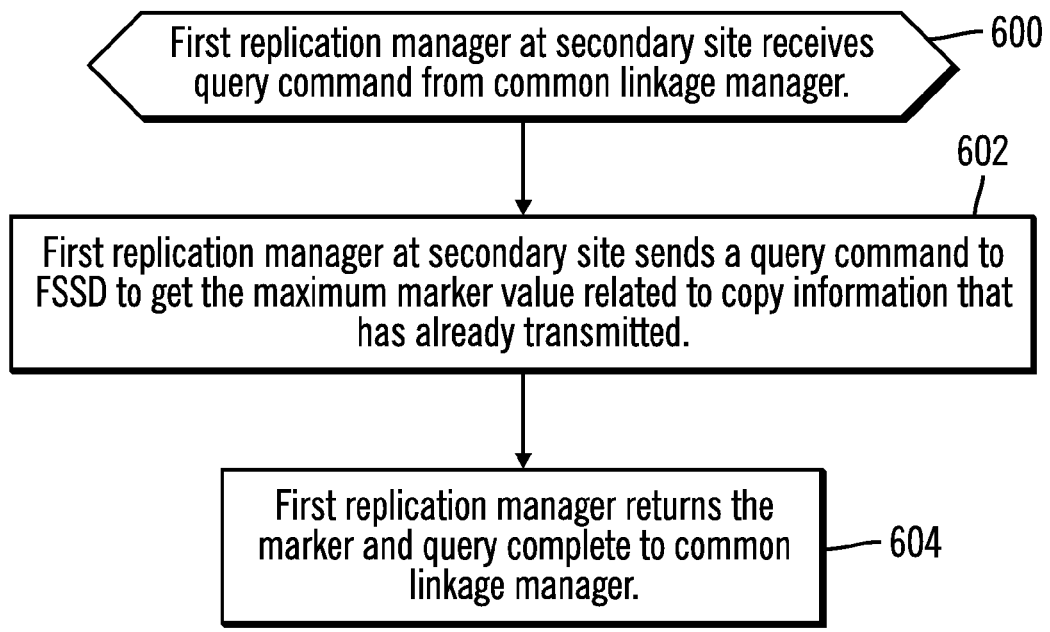
FIG. 20a illustrates an embodiment of a first replication manager at a secondary site to process a query command.

FIG. 20a illustrates an embodiment of operations performed by the first replication manager 6a at the secondary site to process a query command from the common linkage manager 4b. Upon the first replication manager 6b at the secondary site receiving (at block 600) the query command from the common linkage manager 4b, the first replication manager 6b at the secondary site sends (at block 602) a query command to the first secondary site storage devices (FSSD) 24a, 24b . . . 24n to get the maximum marker value related to the copy information that has already transmitted. The first secondary site storage devices (FSSD1, FSSD2, . . . ,FSSDn) 24a, 24b . . . 24n will each respond the maximum marker value in response to this query command from the first replication manager 6b. Since the first storage system 20a, 20b is operated by a single cycle there is only one marker value in each first secondary site storage device (FSSD) 24a, 24b . . . 24n. The first replication manager 6b returns (at block 604) the minimum marker among the maximum markers received by all the first secondary site storage Devices (FSSD, FSSD2, . . . , FSSDn) 24a, 24b . . . 24n and query complete to common linkage manager 4b.

Figure 20B:
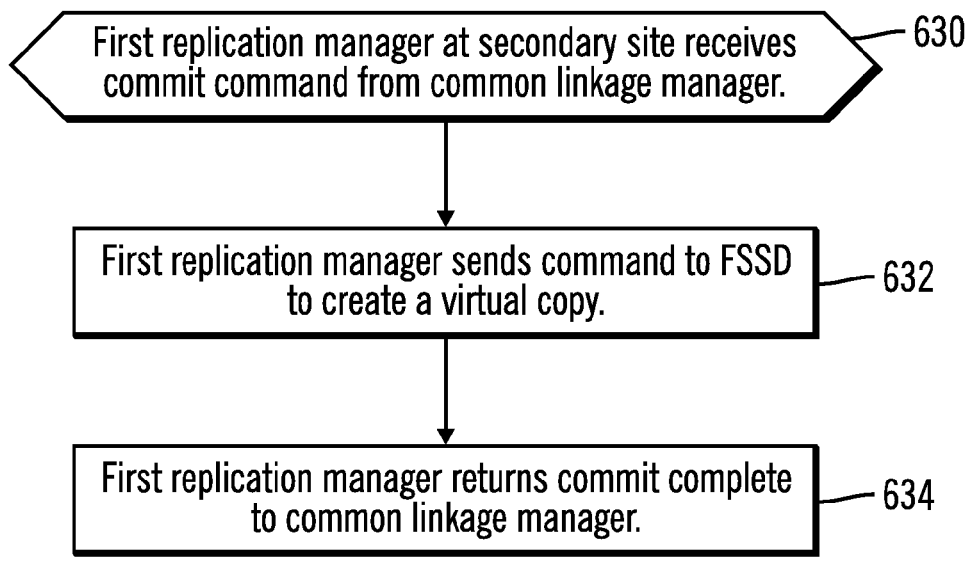
FIG. 20b illustrates an embodiment of a first replication manager at a secondary site to process a commit command.

FIG. 20b illustrates an embodiment of operations performed by the first replication manager 6b at the secondary site to process a commit command from the common linkage manager 4b. Upon the first replication manager 6b at the secondary site receiving (at block 630) the commit command from the common linkage manager 4b, the first replication manager 6b sends (at block 632) a command to the first secondary site storage devices (FSSD) 24a, 24b . . . 24n to create a virtual copy from storage volume 33 to storage volume 34. This copy may be performed by using Flash Copy. The first replication manager 6b then returns (at block 634) commit complete to common linkage manager after all the commit complete messages are received by the first replication manager 6b.

Figure 21A:
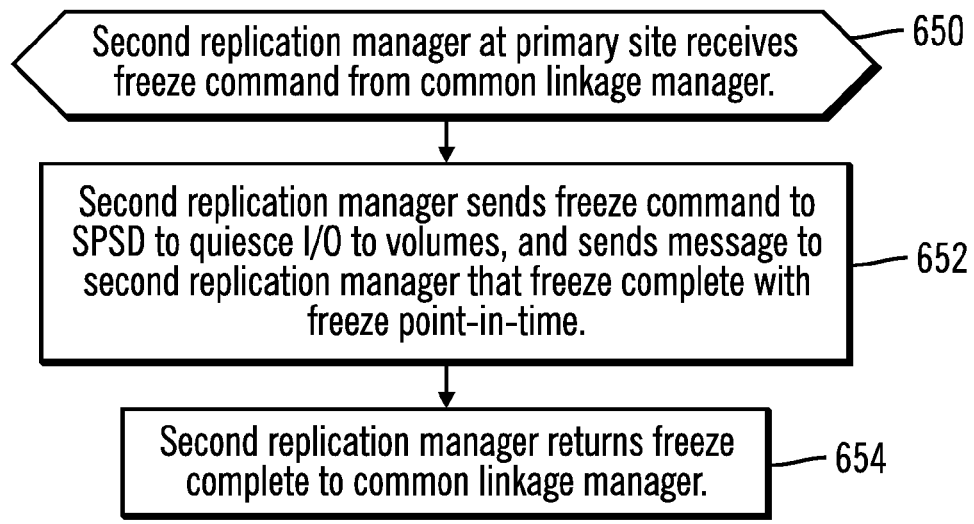
FIG. 21a illustrates an embodiment of a second replication manager at a primary site to process a freeze command.

FIG. 21a illustrates an embodiment of operations performed by the second replication manager 8a at the primary site to process the freeze command from the common linkage manager 4a. Upon the second replication manager 8a at the primary site receiving (at block 650) a freeze command from common linkage manager 4a, the second replication manager 8a sends (at block 652) the freeze command to the second primary site storage devices (SPSD) 23a, 23b . . . 23n. In response to the freeze command, the second primary site storage devices (SPSD) 23a, 23b . . . 23n quiesce I/O to the volumes in the source storage 35 (FIG. 15a), and sends a message to the second replication manager 8a that the freeze completed with a freeze point-in-time. The second replication manager 8a returns (at block 654) freeze complete to the common linkage manager 4a after all the freeze complete messages are received by the second replication manager 8a.

Figure 21B:
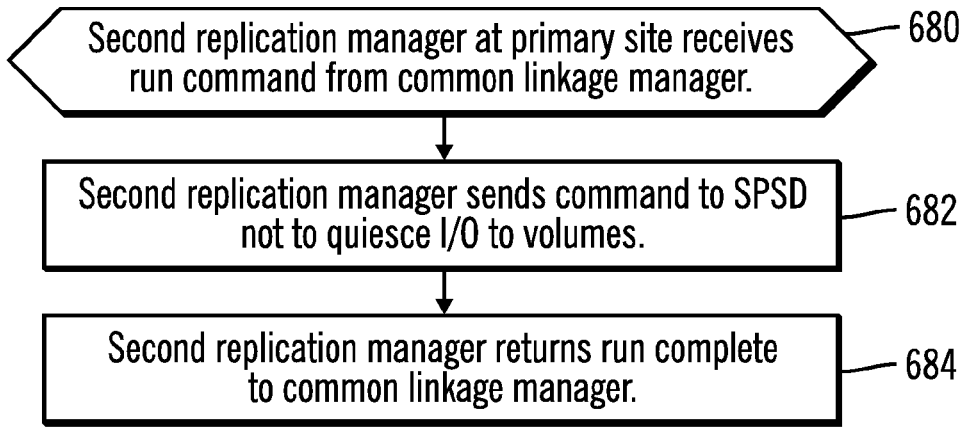
FIG. 21b illustrates an embodiment of a second replication manager at a primary site to process a run command.

FIG. 21b illustrates an embodiment of operations performed by the second replication manager 8a at the primary site to process run command with the marker from the common linkage manager 4a. Upon the second replication manager 8a at the primary site receiving (at block 680) a run command with the marker from the common linkage manager 4a, the second replication manager 8a sends (at block 682) a command to the second primary site storage devices (SPSD) 23a, 23b . . . 23n not to quiesce I/O to the volumes and resume host I/O operations in the source storage 35 (FIG. 15a). The second replication manager 8a returns (at block 684) run complete to the common linkage manager 4a after all the run complete messages are received by the second replication manager 6a.

Figure 21C:
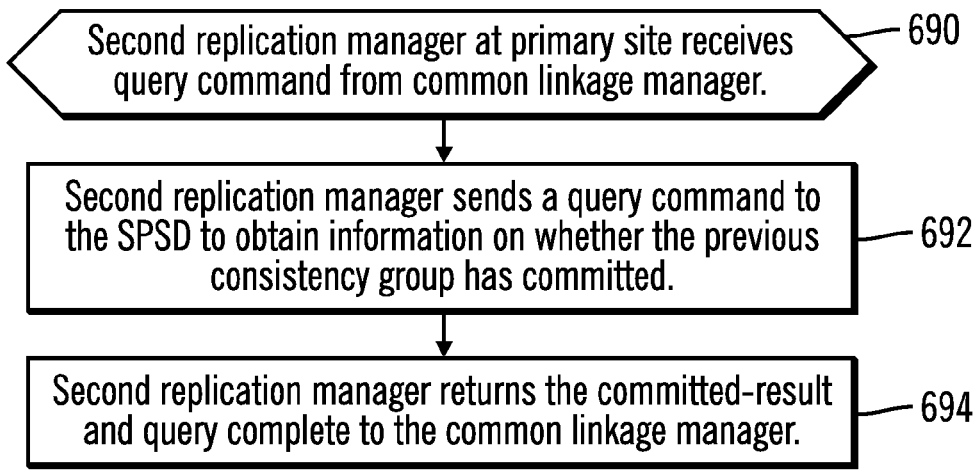
FIG. 21c illustrates an embodiment of a second replication manager at a primary site to process a query command.

FIG. 21c illustrates an embodiment of operations performed by the second replication manager 8a at the primary site to process a query command from the common linkage manager 4a. Upon receiving (at block 690) a query command from the common linkage manager 4a, the second replication manager 8a at the primary site sends (at block 6922) a query command to the second primary site storage devices (SPSD) 23a,23b . . . 23n to obtain information on whether the previous consistency group has committed. Each second primary site storage device (SPSD) 23a, 23b . . . 23n will return that the group has been committed if it has received Apply complete from the secondary site as illustrated in block 990 (FIG. 16b) and will return that the group has been not been committed if it has not received Copy complete from the secondary site or not return a response until it receives a complete message from the secondary site. The second replication manager 8a returns (at block 692) the gathered result of the commit and query complete to the common linkage manager 4a. So unless all the second primary site storage devices (SPSD, SPSD2, . . . , SPSDn) 23a, 23b . . . 23n are committed the second replication manager 8a will return to the common linkage manager that the previous consistency group has not been committed.

Figure 22A:
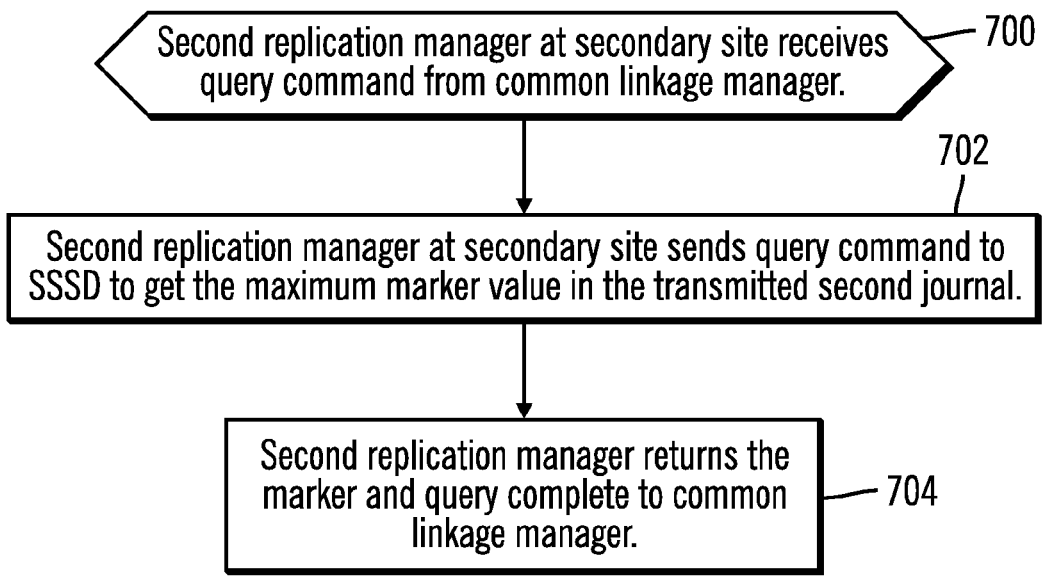
FIG. 22a illustrates an embodiment of a second replication manager at a secondary site to process a query command.

FIG. 22a illustrates an embodiment of operations performed by the second replication manager 8b at the secondary site to process a query command from the common linkage manager 4b. Upon the second replication manager 8b at the secondary site receiving (at block 700) the query command from the common linkage manager 4b, the second replication manager 8b at the secondary site sends (at block 702) a query command to the second secondary site storage devices (SSSD) 25a, 25b . . . 25n to get the maximum marker value related to the copy information that has already transmitted. The second secondary site storage devices (SSSD1, SSSD2, . . . ,SSSDn) 25a, 25b . . . 25n will each respond the maximum marker value in response to this query command from the second replication manager 8b. The second storage systems 21a, 21b allows multiple generations in the system since ACT1, ACT2, and ACT3 are independent loops. So a plurality of markers could be in each second secondary site storage device (SSSD) 25a, 25b . . . 25n. In certain embodiments, because the first storage systems 20a, 20b operates on a single cycle and the commands from each primary site and secondary site from the first and second replication managers are linked by the common replication managers, in this embodiment, there would only a single marker in each second secondary site storage device (SSSD) 25a, 25b . . . 2n. The ACT1, ACT2, and ACT3 may comprise independent loops when they are not linked by the common linkage manager connecting a storage system having a different cycle, that is the system works by itself. If the heterogeneous replication systems were both not operating on a single cycle and has multiple loops in the system there could be a plurality of markers in each second secondary site storage devices (SSSD1, SSSD2, . . . , SSSDn) 25a, 25b . . . 25n. The second replication manager 8b returns (at block 704) the minimum marker among the maximum markers received by all the second secondary site storage device (SSSD) 25a, 25b . . . 25n and query complete to the common linkage manager 4b. The common linkage manager uses the minimum markers and query complete notice to determine the point at which the second storage system 21a, 21b is prepared to apply the data to the storage volumes 38.

Figure 22B:
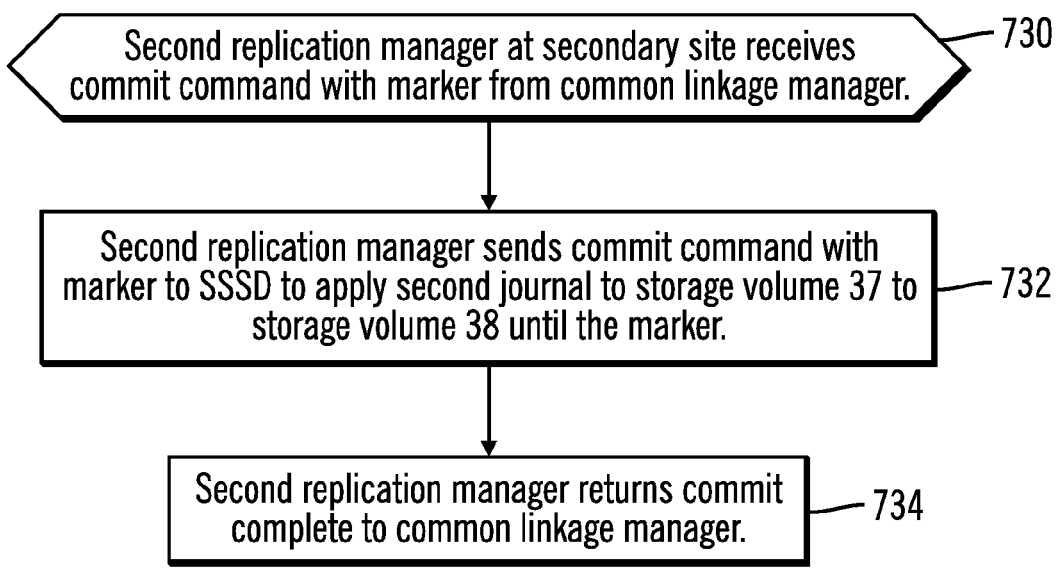
FIG. 22b illustrates an embodiment of a second replication manager at a secondary site to process a commit command.

FIG. 22b illustrates an embodiment of operations performed by the second replication manager 8b at the secondary site to process a commit command from the common linkage manager 4b. Upon the second replication manager 6b at the secondary site receiving (at block 730) the commit command with the marker from the common linkage manager 4b, the second replication manager 8b sends (at block 732) a commit command with the marker to the second secondary site storage devices (SSSD) 25a, 25b . . . 25n to apply the storage volume 37 to storage volume 38 until the journal data including the marker having the same value as the marker received with the commit command is processed. This allows consistency to be maintained between the two heterogeneous replication systems. In this embodiment, since the first storage system 20a,20b operates on a single cycle, the second storage system 21a, 21b may also be controlled to operate as a single cycle by the common linkage manager. Thus, there may be only one marker in the journal data, which would be the most recent journal data having the latest time information before the host was quiesced. The second replication manager 8b returns (at block 734) commit complete to the common linkage manager 4b after all the commit complete messages are received by the second replication manager 8b.

In this embodiment the marker is implemented in response to the Run command. However, in certain embodiments, if the markers are implemented in the same timing cycles for the first storage system and the second storage system, the markers to not have be implemented in response to the Run command and may, instead, be implemented in response to a Freeze command. Further, the marker values may be sent with both Freeze and Run commands from the primary managers and could be installed after the marker values matches. If the values do not match, an error message could be sent to the replication manager. Sending the marker twice the marker value provides additional assurance the marker has been received.

In certain embodiments, the phases are controlled by replication managers in the host, so the storage devices at the primary site and secondary site in each storage system are not required to maintain the consistency within each system. All the storage devices in each storage system may be equivalent and not have master/slave relations among the storage devices in the storage system. The described embodiments are further applicable to storage systems having master/slave relations among the storage devices in the storage systems. If there is a master storage device controlling the slave storage devices in the storage systems at each site, the replication manger will communicate only with the master storage device and the master storage device will send the commands and queries to the slave storage devices and will return representative messages of all the storage devices to the replication manager.

With the described embodiments, by controlling the phases of a plurality of storage systems through two replication managers linked by a common linkage manager at the primary and secondary sites, consistency is maintained among a plurality of storage systems having different replication methods. This allows more reliability for the computing environment since heterogeneous systems have relatively higher reliability compared to homogenous systems. With described embodiments, a system having more generations does not have to be modified to operate as a system having a single generation cycle. For example, if the two heterogeneous systems have multiple generations in each system, the systems will operate by allowing multiple generations in a cycle, while the phase is controlled by the system having the smallest number of generations in a cycle.

With the described embodiments, by providing a common consistency group timestamp across vendor specific replication engines using different replication methods, the common linkage manager 4a, 4b and replication managers 6a, 6b, 8a, 8b are able to form consistency groups across vendor specific replication engines that use different replication technologies. This allows a consumer to deploy heterogeneous replication engines in an integrated storage environment and utilize the heterogeneous replication engines to provide consistency groups that are consistent as of a common point-in-time and restore data in consistency groups formed by replication engines that may use different replication technologies and methods.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Operations described with respect to the primary components, e.g., linkage manager 4a, replication managers 6a, 8a, etc., may be performed by the corresponding secondary components.

Figure 23:
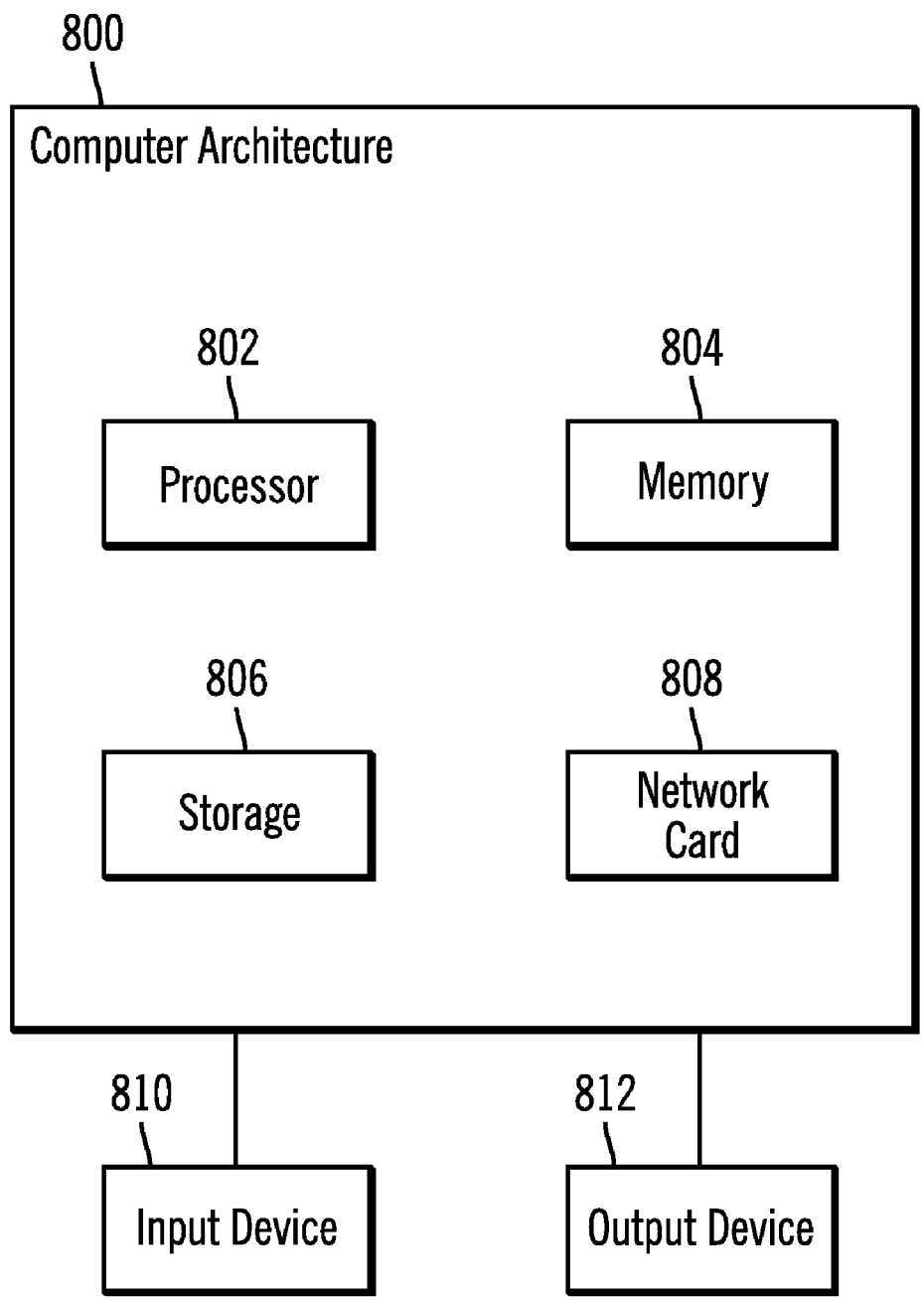
FIG. 23 illustrates an embodiment of a computer architecture that may be used with the systems in FIG. 1.

FIG. 23 illustrates one implementation of a computer architecture 800 that may be implemented for the managers 2a, 2b and controllers 10a, 10b, 12a, 12b of FIG. 1. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs, including an operating system 808, device drivers and application programs, in the storage 806 are loaded into the memory 804 and executed by the processor 802 in a manner known in the art. The architecture further includes a network card 810 to enable communication with a network. An input device 812 is used to provide user input to the processor 812, and may include a keyboard, mouse, pen-stylus, microphone, touch sensitive display screen, or any other activation or input mechanism known in the art. An output device 814 is capable of rendering information transmitted from the processor 812, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements or when used with different instances of the same element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium having a common linkage manager, a first replication manager and a second replication manager executed to communicate with a first target storage, a first source storage, a second target storage, a second source storage, a first replication engine, and a second replication engine, wherein the common linkage manager, first replication manager and the second replication manager are executed to perform operations, the operations, comprising:

issuing, by the common linkage manager, a prepare to create consistency group command to the first replication manager and the second replication manager, wherein the first and the second replication managers issue create consistency group commands to the first and the second replication engines, respectively, to form a consistency group of data at the first source storage and the second source storage to copy to the first target storage and the second target storage, respectively;

forming, by the first and the second replication managers, a first consistency group and a second consistency group of data from the first and the second source storages, respectively, that are consistent as of a point-in-time in response to the create consistency group command;

transmitting, by the first and the second replication managers, the data in the formed first and the second consistency groups to a first journal and second journal, respectively, wherein the first journal is located in a first storage area external to the first source storage and the first target storage and wherein the second journal is located in a second storage area external to the second source storage and the second target storage;

issuing, by the common linkage manager, commit commands to the first and the second replication managers for the consistency group; and committing, by the first and the second replication managers, the data in the first and the second consistency groups in the first journal and the second journal, respectively, to the first and the second target storages, respectively, in response to the first and the second replication managers receiving the commit commands, wherein the first and the second replication managers use different first and second replication technologies to commit data in the first and the second journals to the first and the second target storages, respectively, and wherein the first and the second replication technologies use different methodologies and algorithms to mirror data.

2. The article of manufacture of claim 1, wherein the operations further comprise:

issuing, by the common linkage manager, a subsequent instance of the create consistency group command to the first and the second replication managers to form additional first and second consistency groups at a subsequent point-in-time in response to the first and the second replication managers committing the first and the second consistency groups in the first and the second journals to the first and the second target storages, respectively.

3. The article of manufacture of claim 1, wherein the operations further comprise:

issuing, by the common linkage manager, a query command to the first and the second replication managers;

determining, by the first and the second replication managers, whether the data in the first and the second consistency groups are in the first and the second journals, respectively, in response to the query command;

communicating a first and a second journal complete messages, by the first and the second replication managers, in response to determining that the data in the first and the second consistency groups are in the first and the second journals, respectively; and communicating, by the common linkage manager, a commit command to the first and the second replication managers to commit the data in the first and the second journals in response to receiving the first and the second journal complete messages, respectively.

4. The article of manufacture of claim 1, wherein the create consistency group command comprises a freeze command and a run command, wherein the operations further comprise:

performing, by the first replication manager using the first replication technology, in response to the freeze command, a freeze operation to quiesce writes to the first source storage and create replication information indicating modified data in the first source storage consistent as of the point-in-time to copy to the first journal;

performing, by the first replication manager using the first replication technology, in response to the run command, operations to allow writes to continue to the first source storage and to copy data in the first source storage indicated in the replicate information to the first source storage to the first journal; and performing, by the second replication manager using the second replication technology, operations to copy updates to the second source storage to the second journal, including updates having timestamps before and after the point-in-time of the consistency groups.

5. The article of manufacture of claim 4, wherein the operations further comprise:

performing, by the first replication manager using the first replication technology, in response to the commit command, an operation to create a virtual copy of the data in the first journal at the first target storage indicating data in the first consistency group, wherein data indicated in the virtual copy is copied to the first target storage in response to an update to the data in the first consistency group being applied to the first journal; and performing, by the second replication manager using the second replication technology, in response to the commit command, an operation to copy data in the second journal having timestamps not greater than the point-in-time.

6. The article of manufacture of claim 4, wherein the operations further comprise:
- issuing, by the common linkage manager, a query command to the first and the second replication managers;
- determining, by the first replication manager using the first replication technology, whether the data indicated in the replication information was copied to the first journal;
- determining, by the second replication manager using the second replication technology, whether the second journal includes data having a timestamp greater than the point-in-time;
- wherein the commit operations are performed by the first and the second replication managers in response to determining that the data indicated in the replication information was copied to the first journal and in response to determining that the second journal includes data having a timestamp greater than the point-in-time.

7. The article of manufacture of claim 1, wherein the first and the second replication managers comprise replication managers from different replication manager vendors.

8. The article of manufacture of claim 1, wherein the first and the second replication managers are located at a primary system, wherein the operations further comprise:
- sending, by the common linkage manager, a restore command to a first and second replication managers at a secondary system;
- copying, by the first and the second replication managers at the secondary system, data from the first and the second consistency groups in the first and the second target storages to the first and the second journals, respectively, in response to the restore command;
- committing, by the first and the second replication managers at the secondary system, data from the first and the second consistency groups in the first and the second journals to the first and the second source storages, respectively, to make the data at the first and the second source storages consistent as of the point-in-time of the first and the second consistency groups.

9. The article of manufacture of claim 8, wherein the restore command is sent in response to a failure at the primary site, wherein the operations further comprise:
- performing, by the common linkage manager, a failover from the primary site to the secondary site, wherein applicants submit Input/Output (I/O) requests to the first and the second target storages in response to the failover.

10. The article of manufacture of claim 1, wherein the first and the second replication managers communicate first and second replication engine specific commands to the first and the second replication engines, respectively, to cause the first and the second replication engines to perform operations to form the first and the second consistency groups, respectively, transmit the data in the first and the second consistency groups to the first and the second journals, respectively, and to commit the data in the first and the second journals to the first and the second target storages, respectively.

11. The article of manufacture of claim 1, wherein the operations further comprise:
- communicating a first journal complete message, by the first replication manager, in response to the determining that the data in the first consistency group is in the first journal;
- communicating a second journal complete message, by the second replication manager, in response to the determining that the data in the second consistency group is in the second journal;
- wherein the first and the second replication managers perform the committing of the data in the first and the second consistency groups in the first journal and the second journal, respectively, after the first and the second replication manager communicate the first and the second journal complete messages.

12. A system in communication with a first target storage, a first source storage, a second target storage, and a second source storage, and a first and a second replication engines, comprising:
- a first computer system including a first replication manager in communication with the first replication engine;
- a second computer system including a second replication manager in communication with the second replication engine;
- a common linkage manager, implemented in one of the first and the second computer systems, in communication with the first and the second replication managers, wherein the common linkage manager issues a prepare to create consistency group command to the first and the second replication managers and issues commit commands to the first and the second replication managers for the consistency group; and
- wherein the first and the second replication managers perform operations, the operations comprising:
  - issuing, by the first and the second replication managers, consistency group commands, in response to the create consistency group command from the common linkage manager, to the first and the second replication engines, respectively, to form a consistency group of data at the first source storage and the second source storage to copy to the first target storage and the second target storage, respectively;
  - forming, by the first and the second replication managers, a first consistency group and a second consistency group of data from the first and the second source storages, respectively, that are consistent as of a point-in-time in response to the create consistency group command;
  - transmitting, by the first and the second replication managers, the data in the formed first and the second consistency groups to a first journal and a second journal, respectively, and wherein the first journal is located in a first storage area external to the first source storage and the first target storage and wherein the second journal is located in a second storage area external to the second source storage and the second target storage; and
  - committing, by the first and the second replication managers, the data in the first and the second consistency groups in the first and the second journals to the first and the second target storages, respectively, in response to the first and the second replication managers receiving the commit commands from the common link manager, wherein the first and the second replication managers use different first and second replication technologies to commit data in the first and the second journals to the first and the second target storages, respectively, and wherein the first and the second replication technologies use different methodologies and algorithms to minor data.

13. The system of claim 12,
- wherein the common linkage manager issues a query command to the first and the second replication managers,
- wherein the first and the second replication managers further perform:
  - determining, by the first and the second replication managers, whether the data in the first and the second consistency groups are in the first and the second journals, respectively, in response to the query command;

communicating a first and a second journal complete messages, by the first and the second replication managers, in response to determining that the data in the first and the second consistency groups are in the first and the second journals, respectively; and wherein the common linkage manager further communicates a commit command to the first and the second replication managers to commit the data in the first and the second journals in response to receiving the first and the second journal complete messages.

14. The system of claim 12, wherein the create consistency group command comprises a freeze command and a run command, wherein the first replication manager further performs:
using the first replication technology, in response to the freeze command, to perform a freeze operation to quiesce writes to the first source storage and create replication information indicating modified data in the first source storage consistent as of the point-in-time to copy to the first journal;
using the first replication technology, in response to the run command, to perform operations to allow writes to continue to the first source storage and to copy data in the first source storage indicated in the replicate information to the first source storage to the first journal; and
wherein the second replication manager uses the second replication technology to perform operations to copy updates to the second source storage to the second journal, including updates having timestamps before and after the point-in-time of the consistency groups.

15. The system of claim 14,
wherein the first replication manager further performs, using the first replication technology, in response to the commit command, an operation to create a virtual copy of the data in the first journal at the first target storage indicating data in the first consistency group, wherein data indicated in the virtual copy is copied to the first target storage in response to an update to the data in the first consistency group being applied to the first journal; and
wherein the second replication manager performs, using the second replication technology, in response to the commit command, an operation to copy data in the second journal having timestamps not greater than the point-in-time.

16. The system of claim 12, wherein the first and the second replication managers communicate first and second replication engine specific commands to the first and the second replication engines, respectively, to cause the first and the second replication engines to perform operations to form the first and the second consistency groups, respectively, transmit the data in the first and the second consistency groups to the first and the second journals, respectively, and to commit the data in the first and the second journals to the first and the second target storages, respectively.

17. The system of manufacture of claim 12, wherein the operations further comprise:
communicating a first journal complete message, by the first replication manager, in response to the determining that the data in the first consistency group is in the first journal;
communicating a second journal complete message, by the second replication manager, in response to the determining that the data in the second consistency group is in the second journal;
wherein the first and the second replication managers perform the committing of the data in the first and the second consistency groups in the first journal and the second journal, respectively, after the first and the second replication manager communicate the first and the second journal complete messages.

18. A method, comprising:
issuing, from a common link manager in a computer system, a prepare to create consistency group command to a first replication manager and a second replication manager, wherein the first and the second replication managers issue create consistency group commands to a first and a second replication engines, respectively, to form a consistency group of data at a first source storage and a second source storage to copy to a first target storage and a second target storage, respectively;
forming, by the first and the second replication managers, a first consistency group and a second consistency group of data from the first and the second source storages, respectively, that are consistent as of a point-in-time in response to the create consistency group command;
transmitting, by the first and the second replication managers, the data in the formed first and the second consistency groups to a first journal and a second journal, respectively and wherein the first journal is located in a first storage area external to the first source storage and the first target storage and wherein the second journal is located in a second storage area external to the second source storage and the second target storage;
issuing, by the common linkage manager, commit commands to the first and the second replication managers for the consistency group; and
committing, by the first and the second replication managers, the data in the first and the second consistency groups in the first and the second journals to the first and the second target storages, respectively, in response to the first and the second replication managers receiving the commit commands, wherein the first and the second replication managers use different first and second replication technologies to commit data in the first and the second journals to the first and the second target storages, respectively, and wherein the first and the second replication technologies use different methodologies and algorithms to mirror data.

19. The method of claim 18 further comprising:
issuing a query command to the first and the second replication managers;
determining, by the first and the second replication managers, whether the data in the first and the second consistency groups are in the first and the second journals, respectively, in response to the query command;
communicating a first and a second journal complete messages, by the first and the second replication managers, in response to determining that the data in the first and the second consistency groups are in the first and the second journals, respectively; and
communicating a commit command to the first and the second replication managers to commit the data in the first and the second journals in response to receiving the first and the second journal complete messages.

20. The method of claim 18, wherein the create consistency group command comprises a freeze command and a run command, further comprising:

performing, by the first replication manager using the first replication technology, in response to the freeze command, a freeze operation to quiesce writes to the first source storage and create replication information indicating modified data in the first source storage consistent as of the point-in-time to copy to the first journal;

performing, by the first replication manager using the first replication technology, in response to the run command, operations to allow writes to continue to the first source storage and to copy data in the first source storage indicated in the replicate information to the first source storage to the first journal; and performing, by the second replication manager using the second replication technology, operations to copy updates to the second source storage to the second journal, including updates having timestamps before and after the point-in-time of the consistency groups.

21. The method of claim 20, further comprising:
performing, by the first replication manager using the first replication technology, in response to the commit command, an operation to create a virtual copy of the data in the first journal at the first target storage indicating data in the first consistency group, wherein data indicated in the virtual copy is copied to the first target storage in response to an update to the data in the first consistency group being applied to the first journal; and performing, by the second replication manager using the second replication technology, in response to the commit command, an operation to copy data in the second journal having timestamps not greater than the point-in-time.

22. The method of claim 18, wherein the first and the second replication managers comprise replication managers from different replication manager vendors.

23. The method of claim 18, wherein the first and the second replication managers communicate first and second replication engine specific commands to the first and the second replication engines, respectively, to cause the first and the second replication engines to perform operations to form the first and the second consistency groups, respectively, transmit the data in the first and the second consistency groups to the first and the second journals, respectively, and to commit the data in the first and the second journals to the first and the second target storages, respectively.

24. The method of claim 18, further comprising:
communicating a first journal complete message, by the first replication manager, in response to the determining that the data in the first consistency group is in the first journal;

communicating a second journal complete message, by the second replication manager, in response to the determining that the data in the second consistency group is in the second journal;

wherein the first and the second replication managers perform the committing of the data in the first and the second consistency groups in the first journal and the second journal, respectively, after the first and the second replication manager communicate the first and the second journal complete messages.

* * * * *